(12) United States Patent
Marley et al.

(10) Patent No.: US 12,399,794 B2
(45) Date of Patent: Aug. 26, 2025

(54) INFRASTRUCTURE MANAGEMENT SYSTEM AND METHOD

(71) Applicant: Panduit Corp., Tinley Park, IL (US)

(72) Inventors: Kevin A. Marley, Joliet, IL (US); Brian L. Kelly, Oak Forest, IL (US)

(73) Assignee: Panduit Corp., Tinley Park, IL (US)

( * ) Notice: Subject to any disclaimer, the term of this patent is extended or adjusted under 35 U.S.C. 154(b) by 148 days.

(21) Appl. No.: 18/127,690

(22) Filed: Mar. 29, 2023

(65) Prior Publication Data
US 2023/0333952 A1    Oct. 19, 2023

Related U.S. Application Data

(60) Provisional application No. 63/330,911, filed on Apr. 14, 2022.

(51) Int. Cl.
G06F 11/30    (2006.01)
G06K 7/10    (2006.01)

(52) U.S. Cl.
CPC ...... *G06F 11/3006* (2013.01); *G06F 11/3065* (2013.01); *G06K 7/10861* (2013.01)

(58) Field of Classification Search
CPC ............. G06F 11/3006; G06F 11/3065; G06K 7/10861
See application file for complete search history.

(56) References Cited

U.S. PATENT DOCUMENTS

| | | |
|---|---|---|
| 5,704,189 A | 1/1998 | Collier |
| 7,229,020 B2 | 6/2007 | Goodison et al. |
| 7,312,715 B2 | 12/2007 | Shalts et al. |
| 8,094,020 B2 | 1/2012 | Groth et al. |
| 8,117,092 B2 | 2/2012 | Farkas et al. |
| 8,854,822 B2 | 10/2014 | Hazzard et al. |
| 8,887,993 B2 | 11/2014 | Floyd et al. |
| 8,914,495 B2 | 12/2014 | Das et al. |
| 8,917,512 B2 | 12/2014 | Lozon et al. |

(Continued)

FOREIGN PATENT DOCUMENTS

| | | |
|---|---|---|
| EP | 3399698 A1 | 11/2018 |
| WO | 2020219910 A1 | 10/2020 |
| WO | 2021243110 A1 | 12/2021 |

*Primary Examiner* — Jigar P Patel
(74) *Attorney, Agent, or Firm* — Peter S. Lee; Christopher S. Clancy; James H. Williams

(57) ABSTRACT

A system for management of telecommunication or data center infrastructure including multiple components may include a scanner to scan a unique identifier attached to a component of the infrastructure, and a mobile device which may include a processor, a data storage medium storing machine readable instructions, a communication unit, and a user interface including a display. The mobile computing device may execute the machine readable instructions to (i) receive, from the scanner, a component identifier associated with the component obtained via a scan of the unique identifier attached to the component, (ii) associate the component identifier with a location of the component in the infrastructure, (iii) display, on the user interface, the component identifier associated with the location of the component, and (iv) export, via the communication unit, the location of the component to a management solution for use in management of the component in the infrastructure.

19 Claims, 31 Drawing Sheets

(56) References Cited

U.S. PATENT DOCUMENTS

| | | |
|---|---|---|
| 9,064,022 B2 | 6/2015 | Smith et al. |
| 9,111,466 B2 | 8/2015 | Dor et al. |
| 9,378,481 B2 | 6/2016 | Hastman |
| 9,965,564 B2 | 5/2018 | Whelihan |
| 9,984,265 B2 | 5/2018 | Martin et al. |
| 10,078,812 B2 | 9/2018 | Khuti et al. |
| RE48,128 E | 7/2020 | Smith et al. |
| 10,817,485 B2 | 10/2020 | Nielsen et al. |
| 11,087,054 B2 | 8/2021 | Austern et al. |
| 2002/0008621 A1 | 1/2002 | Barritz et al. |
| 2002/0095487 A1 | 7/2002 | Day et al. |
| 2004/0099736 A1 | 5/2004 | Neumark |
| 2009/0195384 A1 | 8/2009 | Amidi |
| 2012/0166693 A1* | 6/2012 | Weinstock ........... G06Q 10/087 340/687 |
| 2012/0316778 A1 | 12/2012 | Vande Linde et al. |
| 2014/0258052 A1* | 9/2014 | Khuti .................. G06Q 10/087 705/28 |
| 2015/0370873 A1* | 12/2015 | Macugay ............. G06F 16/254 707/602 |
| 2017/0103290 A1* | 4/2017 | Guionneau ........... G06Q 10/08 |
| 2018/0285607 A1 | 10/2018 | Chojnacki |
| 2019/0098794 A1* | 3/2019 | Chen .................... H05K 7/1461 |
| 2020/0186423 A1 | 6/2020 | Torres et al. |
| 2021/0279437 A1 | 9/2021 | Marley et al. |

\* cited by examiner

Rack ID  12345678X0001

Comment  PanelC - to ABQ-1C

RU number  39  to  39

Rack Name  Chicago-rack1A

| RU # | RackID | Comment | Part # |
|------|--------|---------|--------|
| 40 | 99999999X0011 | ISP-B Windstream gear | |
| 41 | 99999999X0012 | ISP-A Comcast gear | |
| 42 | 11223344X0295 | Panel B - ISP conection | CP24BLY |
| 43 | 12344321X0002 | 2RU cable manager | NCMH2 |
| 44 | 12344321X0002 | 2RU cable manager | NCMH2 |
| 45 | 12341234X0299 | Panel A - to ABQ-1B | CP24BLY |
| 0 | 11133324X0132 | ABQ-1A-PDU-A left side | P38D25M |
| 0 | 11111111X0132 | ABQ-1A 45RU cabinet | XG74512BS0001 |

FIG.4

| Rack ID | 12345678X0001 | | Rack Name | Chicago-rack1A |
| --- | --- | --- | --- | --- |
| Comment | PanelC - to ABQ-1C | | | |
| RU number | 39 to 39 ← 20 | | | |

| RU # | RackID | Comment | Part # |
| --- | --- | --- | --- |
| 40 | 99999999X0011 | ISP-B Windstream gear | |
| 41 | 99999999X0012 | ISP-A Comcast gear | |
| 42 | 11223344X0295 | Panel B - ISP conection | CP24BLY |
| 43 | 12344321X0002 | 2RU cable manager | NCMH2 |
| 44 | 12344321X0002 | 2RU cable manager | NCMH2 |
| 45 | 12341234X0299 | Panel A - to ABQ-1B | CP24BLY |
| 0 | 11133324X0132 | ABQ-1A-PDU-A left side | P38D25M |
| 0 | 11111111X0132 | ABQ-1A 45RU cabinet | XG74512BS0001 |

FIG.5

| Rack ID | 12345678X0001 | | Rack Name | Chicago-rack1A |
| --- | --- | --- | --- | --- |
| Comment | PanelC - to ABQ-1C | | | |
| RU number | 39 to 39 | | | |

| RU # | RackID | Comment | Part # |
| --- | --- | --- | --- |
| 40 | 99999999X0011 | ISP-B Windstream gear | |
| 41 | 99999999X0012 | ISP-A Comcast gear | |
| 42 | 11223344X0295 | Panel B - ISP conection | CP24BLY |
| 43 | 12344321X0002 | 2RU cable manager | NCMH2 |
| 44 | 12344321X0002 | 2RU cable manager | NCMH2 |
| 45 | 12341234X0299 | Panel A - to ABQ-1B | CP24BLY |
| 0 | 11133324X0132 | ABQ-1A-PDU-A left side | P38D25M |
| 0 | 11111111X0132 | ABQ-1A 45RU cabinet | XG74512BS0001 |

FIG. 10

| MPO END / LC END | METHOD A 12F - CASSETTE (AS) | | | | | | | | | | | |
|---|---|---|---|---|---|---|---|---|---|---|---|---|
| | FIBER POSITION FROM MPO END TO LC END | | | | | | | | | | | |
| MPO | 1 | 2 | 3 | 4 | 5 | 6 | 7 | 8 | 9 | 10 | 11 | 12 |
| LC | 1 | 2 | 3 | 4 | 5 | 6 | 7 | 8 | 9 | 10 | 11 | 12 |

| MPO END / LC END | METHOD A FLIPPED 12F - CASSETTE (AF) | | | | | | | | | | | |
|---|---|---|---|---|---|---|---|---|---|---|---|---|
| | FIBER POSITION FROM MPO END TO LC END | | | | | | | | | | | |
| MPO | 1 | 2 | 3 | 4 | 5 | 6 | 7 | 8 | 9 | 10 | 11 | 12 |
| LC | 2 | 1 | 4 | 3 | 6 | 5 | 8 | 7 | 10 | 9 | 12 | 11 |

| MPO END / LC END | METHOD B 12F - CASSETTE (BN) | | | | | | | | | | | |
|---|---|---|---|---|---|---|---|---|---|---|---|---|
| | FIBER POSITION FROM MPO END TO LC END | | | | | | | | | | | |
| MPO | 12 | 11 | 10 | 9 | 8 | 7 | 6 | 5 | 4 | 3 | 2 | 1 |
| LC | 1 | 2 | 3 | 4 | 5 | 6 | 7 | 8 | 9 | 10 | 11 | 12 |

| MPO END / LC END | UNIVERSAL 12F - CASSETTE (U) | | | | | | | | | | | |
|---|---|---|---|---|---|---|---|---|---|---|---|---|
| | FIBER POSITION FROM MPO END TO LC END | | | | | | | | | | | |
| MPO | 1 | 2 | 3 | 4 | 5 | 6 | 7 | 8 | 9 | 10 | 11 | 12 |
| LC | 1 | 12 | 2 | 11 | 3 | 10 | 4 | 9 | 5 | 8 | 6 | 7 |

FIG. 16

Cable Capacity Calculator V9

Enter the cable diameter below and select in. or mm

| Cable Diameter = | 0.250 | in. ▶ |
|---|---|---|
| | Duplex Cable? | no ▶ |

| Product Family | Part Number | Description | Cable Manager Area | | |
|---|---|---|---|---|---|
| | | | Front Usable Area (sq. in.) | Rear Usable Area (sq. in.) | Total Usable Area (sq. in.) |
| PR2V PatchRunner™ 2 Vertical Cable Managers | PR2VD06 | 6" wide | 45.1 | 27.3 | 72.4 |
| | PR2VFD06 | 6" wide, front only | 45.1 | 0.0 | 45.1 |
| | PR2VD08 | 8" wide | 63.7 | 39.7 | 103.4 |
| | PR2VFD08 | 8" wide, front only | 63.7 | 0.0 | 63.7 |
| | PR2VD10 | 10" wide | 82.3 | 52.2 | 134.5 |
| | PR2VFD10 | 10" wide, front only | 82.3 | 0.0 | 82.3 |
| | PR2VD12 | 12" wide | 100.9 | 64.7 | 165.6 |
| | PR2VFD12 | 12" wide, front only | 100.9 | 0.0 | 100.9 |
| Single PR2V Flinger | | | | | |
| PR2VRG PatchRunner™ 2 Rear Gate Accessory | PR2VRGSK06 | 6" wide gate kit | 0.0 | 43.5 | 43.5 |
| | PR2VRGSK08 | 8" wide gate kit | 0.0 | 59.5 | 59.5 |
| | PR2VRGSK10 | 10" wide gate kit | 0.0 | 75.6 | 75.6 |
| | PR2VRGSK12 | 12" wide gate kit | 0.0 | 91.6 | 91.6 |

FIG.22A

INFRASTRUCTURE MANAGEMENT SYSTEM AND METHOD

CROSS-REFERENCE TO RELATED APPLICATION(S)

This application claims benefit to U.S. Provisional Patent Application No. 63/330,911, filed on Apr. 14, 2022, the entirety of which is incorporated by reference herein.

TECHNICAL FIELD

The following relates to a system, method, and non-transitory computer readable medium including instructions for management of equipment and components found in a telecommunications or data center.

BACKGROUND

Datacenters and telecommunication rooms are filled with computing, storage, and networking systems that include physical infrastructure such as server cabinets, telecom racks, patch panels, fiber cassettes and cable managers. Many datacenter managers and telecom operators create digital models of their rooms using DCIM (Data Center Infrastructure Management) solutions (e.g., software applications) to document the components in their rooms to assist in remote management and troubleshooting of issues that may arise. Creating digital representations of physical equipment may require large amounts of data that must be manually entered. This time-consuming process can easily introduce errors and any updates to the physical location requires subsequent manual data entry to update physical changes to the digital copy, which is a significant drain of enterprise resources.

Considering the amount of equipment and cabling that can occupy a datacenter, the amount of manual data entry required to effectively operate a DCIM solution can easily become very time-consuming and overwhelming often resulting in errors or documentation that is out of date. A need therefore exists for a system, method, and application program for improved infrastructure management of telecommunication or data center infrastructure that is more efficient and less consuming of valuable enterprise resources.

SUMMARY

According to one non-limiting exemplary embodiment of the present disclosure, a system is provided for management of telecommunication or data center infrastructure including a plurality of components. The system may comprise a scanner which may be configured to scan a unique identifier attached to a component of the infrastructure, and a mobile computing device which may comprise a processor, a data storage medium storing machine readable instructions, a communication unit, and a user interface including a display. The mobile computing device may be configured to execute the machine readable instructions to (i) receive, from the scanner, a component identifier associated with the component obtained via a scan of the unique identifier attached to the component, (ii) associate the component identifier with a location of the component in the infrastructure, (iii) display, on the user interface, the component identifier associated with the location of the component, and (iv) export, via the communication unit, the location of the component to a management solution for use in management of the component in the plurality of components of the infrastructure.

A detailed description of this and other non-limiting exemplary embodiments of a system, method, and non-transitory computer readable storage medium for management of telecommunication or data center infrastructure is set forth below together with the accompanying drawings.

BRIEF DESCRIPTION OF THE DRAWINGS

FIG. 4 illustrates exemplary user entry of a cabinet/rack name into a graphical user interface displayed on a display, according to a non-limiting exemplary embodiment of the present disclosure.

FIG. 5 illustrates exemplary user entry of location/rack unit information into a graphical user interface displayed on a display, according to one non-limiting exemplary embodiments of the present disclosure.

FIG. 10 illustrates exemplary application software output of results of a "verify" mode operation in a graphical user interface, according to a non-limiting exemplary embodiment of the present disclosure.

FIG. 16 illustrates a table illustrating wiring methods for a fiber cassette for use with a non-limiting exemplary embodiment of the present disclosure.

FIG. 22A illustrates a cable capacity calculator for manual calculation of cable capacity, according to a non-limiting exemplary embodiment of the present disclosure.

DETAILED DESCRIPTION

Detailed non-limiting embodiments are disclosed herein. However, it is to be understood that the disclosed embodiments are merely exemplary and may take various and alternative forms. The figures are not necessarily to scale, and features may be exaggerated or minimized to show details of particular components. Therefore, specific structural and functional details disclosed herein are not to be interpreted as limiting, but merely as a representative basis for teaching one skilled in the art.

Datacenter Infrastructure Management (DCIM) solutions are a collection of tools designed to provide proactive failure avoidance, planning capabilities, and cost savings to operators of data centers that include equipment such as fiber cable management equipment, copper cable management equipment, audio/visual equipment, or the like (hereinafter generally referred to as "data centers"). Features provided by a DCIM solution may include monitoring critical infrastructure of a data center such as power and cooling systems for analysis and cost reduction, documenting and managing physical infrastructure such as equipment inventory within a data center, or data and power connectivity to diagnose problems that may arise in a data center, work order creation and processing for physical equipment moves, adds, and changes. The DCIM solution described herein includes software, hardware, and/or circuitry for implementing the features of the DCIM solution described herein.

Figure 23:
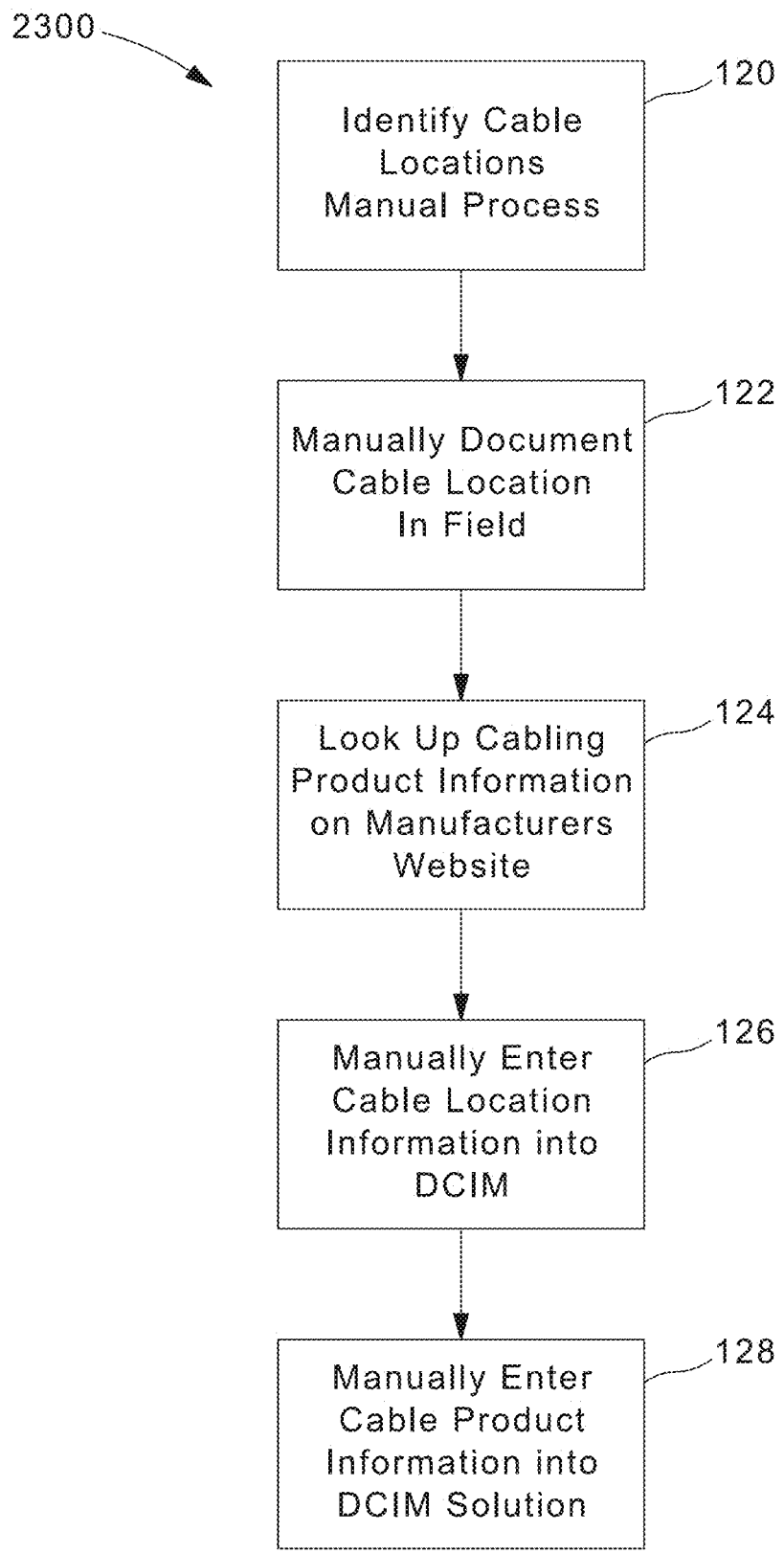
FIG. 23 illustrates a flowchart describing a known method of documenting equipment and cable infrastructure locations and inputting product information.

DCIM solutions documents physical infrastructure systems by creating a digital version or "digital twin" of the physical environment in software to re-create the actual physical environment. This digital version may be created according to downloaded and manually entered data that allows for remote viewing, planning, and analysis to be performed without physically being on-site the physical data center. So while DCIM solutions may rely heavily on data inputs to gather information, unfortunately most physical infrastructure installations require that data be entered manually. In that regard, FIG. 23 shows a flowchart 2300 describing an exemplary method of documenting equipment and cable infrastructure locations and inputting product information. As seen therein, such a method includes manually identifying 120 cable locations, manually documenting 122 cable location information in the field, looking up 124 cabling product information at a manufacturer website, manually entering 126 cable location information into a DCIM solution, and manually entering 128 cable product information into the DCIM solution.

Examples of data that may be entered manually into DCIM solution might be: equipment location in a datacenter rack (e.g., rack unit (RU) location or other location in a rack or cabinet of equipment such as a vertical power distribution unit (PDU) mounted in a cabinet's rear left compartment), type of equipment (e.g., server, network switch, PDU, uninterruptable power supply (UPS)), equipment specific information for each type of equipment (e.g., PDU information might contain the following: number of outlets, outlet type, power rating, plug type), cable end locations for network cables, cable end locations for power cables, cable product information, cable length information, cable connector type information, or other equipment found in the data center.

Considering the amount of equipment and cabling that may occupy a datacenter, the amount of manual data entry required to effectively operate a DCIM solution can easily become very time-consuming and overwhelming, which may result in manual data input errors or reliance on outdated documentation. Thus, as also previously described, a need exists for a system, method, and application program for improved infrastructure management of a datacenter.

It follows that the present disclosure describes a DCIM solution for providing more efficient and resource saving solutions for the management of equipment and components found in a data center. In addition, a cable management solution is disclosed for obtaining data on cable attributes within a data center, where the cabling data is then provided as inputs to the DCIM solution for the DCIM solution to implement the DCIM features disclosed herein. The DCIM solution described herein may include the hardware, software, and/or circuitry for implementing the features attributed to it as described herein.

With reference to FIGS. 1-30, a more detailed description of non-limiting exemplary embodiments of a system, method, and non-transitory computer readable storage medium for including instructions for the management of a data center infrastructure according to the DCIM solution will be provided. For ease of illustration and to facilitate understanding, like reference numerals may be used herein for like components and features throughout the drawings.

The present DCIM solution reduces the amount of time spent documenting physical infrastructure and provides product information without manual data entry. In that regard, unique identifiers are placed onto data center equipment, and intelligent software is utilized to provide physical infrastructure documentation without the inconvenience and/or problems associated with manually entering product information. Once a network cabinet or telecom rack has been scanned, the DCIM solution can then reference other saved information to validate equipment or audit installations.

Figure 1:
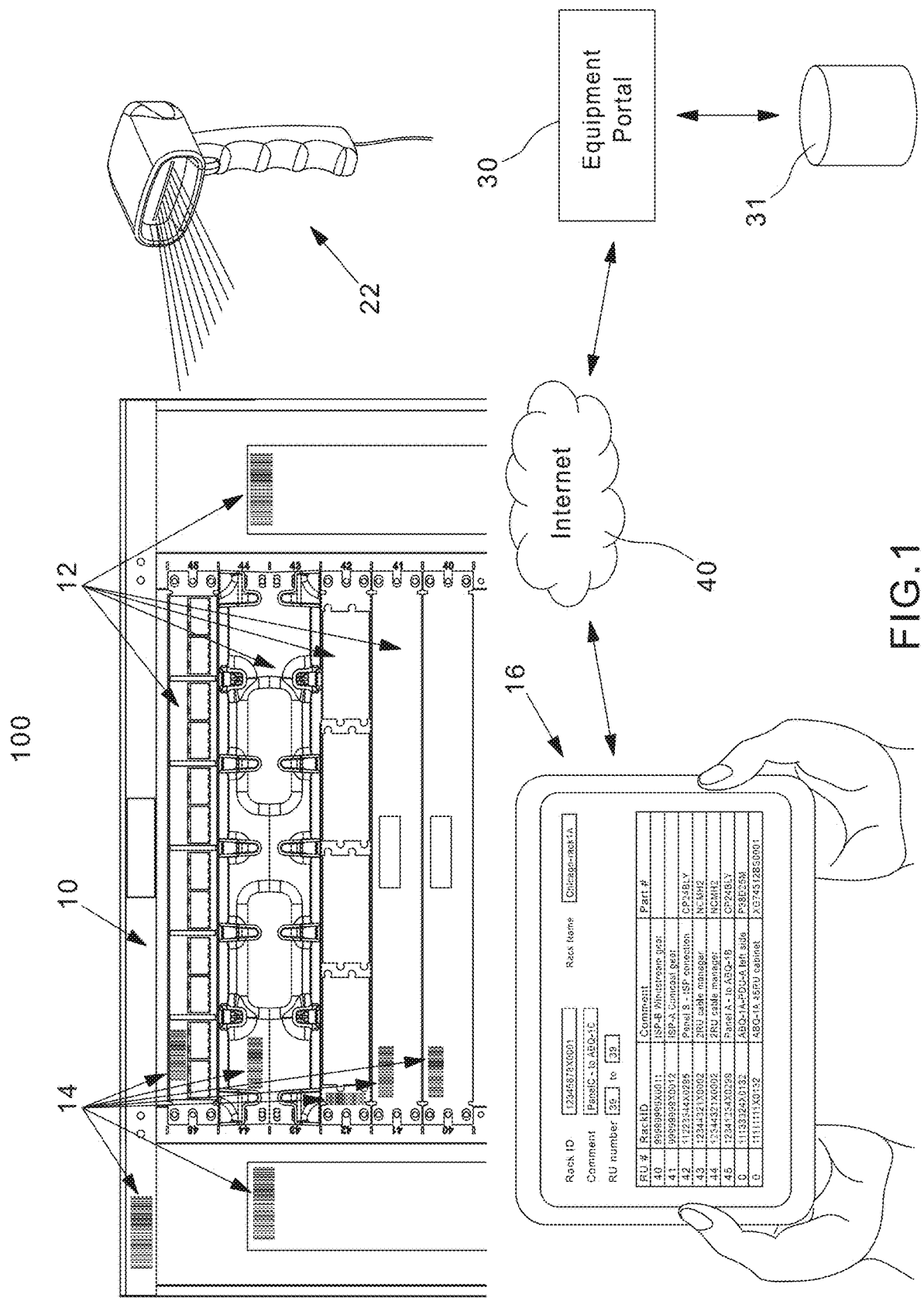
FIG. 1 illustrates an exemplary system for implementing a cable management solution, according to one non-limiting exemplary embodiment of the present disclosure.

The disclosed equipment management solution includes software, hardware, and/or circuitry for implementing the features for identifying and documenting cables, network cabinets, telecommunication racks, and other data center equipment according to the present disclosure, as well as any other features described herein. As shown in FIG. 1, the equipment management solution may be used in a system 100 that includes infrastructure equipment 12 having a unique identifier 14 (e.g., barcode or QR code) attached. For example, the infrastructure equipment 12 may include, but not be limited to: cabinets 10, telecom racks, fiber trays, fiber cassettes, copper and fiber patch panels, plug packs, cable managers, power distribution units, or any other equipment found in a data center. The system 100 also includes a personal computer or mobile computing device 16 having a user interface including a display and executing application software according to the present disclosure. For example, the equipment management solution may include and/or be an extension of the cable management solution for obtaining cable related information described in U.S. patent application Ser. No. 17/191,984 (now U.S. Pat. No. 11,347, 955 issued May 31, 2022), the entirety of which is hereby incorporated by reference herein.

The system 100 also includes a common barcode scanner 22 configured to communicate via Bluetooth, universal serial bus (USB), serial connection, Wi-Fi, radio-frequency (RF), or other known data communication protocol, to the mobile computing device 16 running the application software of the present disclosure. An exemplary use for the barcode scanner 22 is provided with reference to FIG. 6.

The system 100 utilizes an internet connection 40 to communicate with an equipment portal (e.g., equipment manufacturer internet portal) to download product information via an appropriate application programming interface (API), which may be a Representational State Transfer (REST) or any other suitable API. The product information may be stored on a database 31 operated or in control by the equipment portal. In addition or alternatively, the product information may be stored on a memory storage included on the mobile computing device 16.

Figure 3:
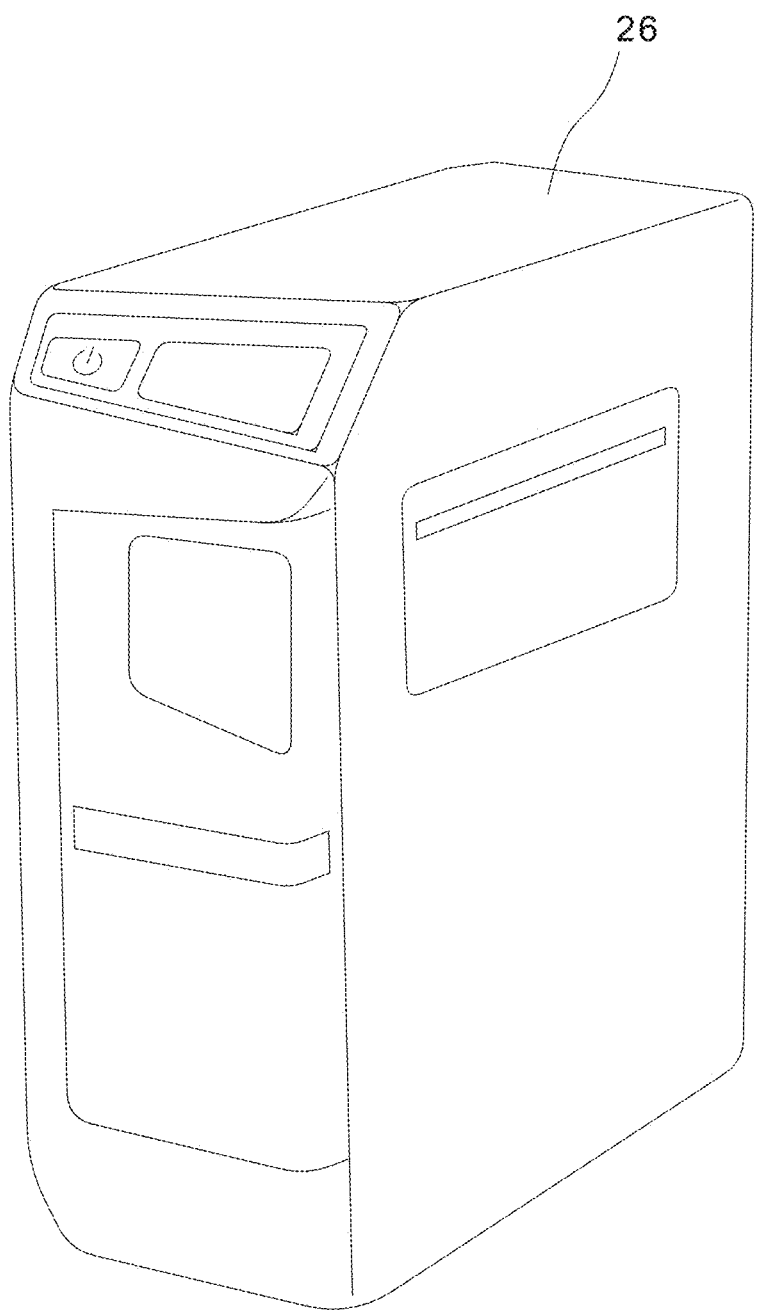
FIG. 3 illustrates an exemplary mobile label printer, according to a non-limiting exemplary embodiment of the present disclosure.
Figure 8:
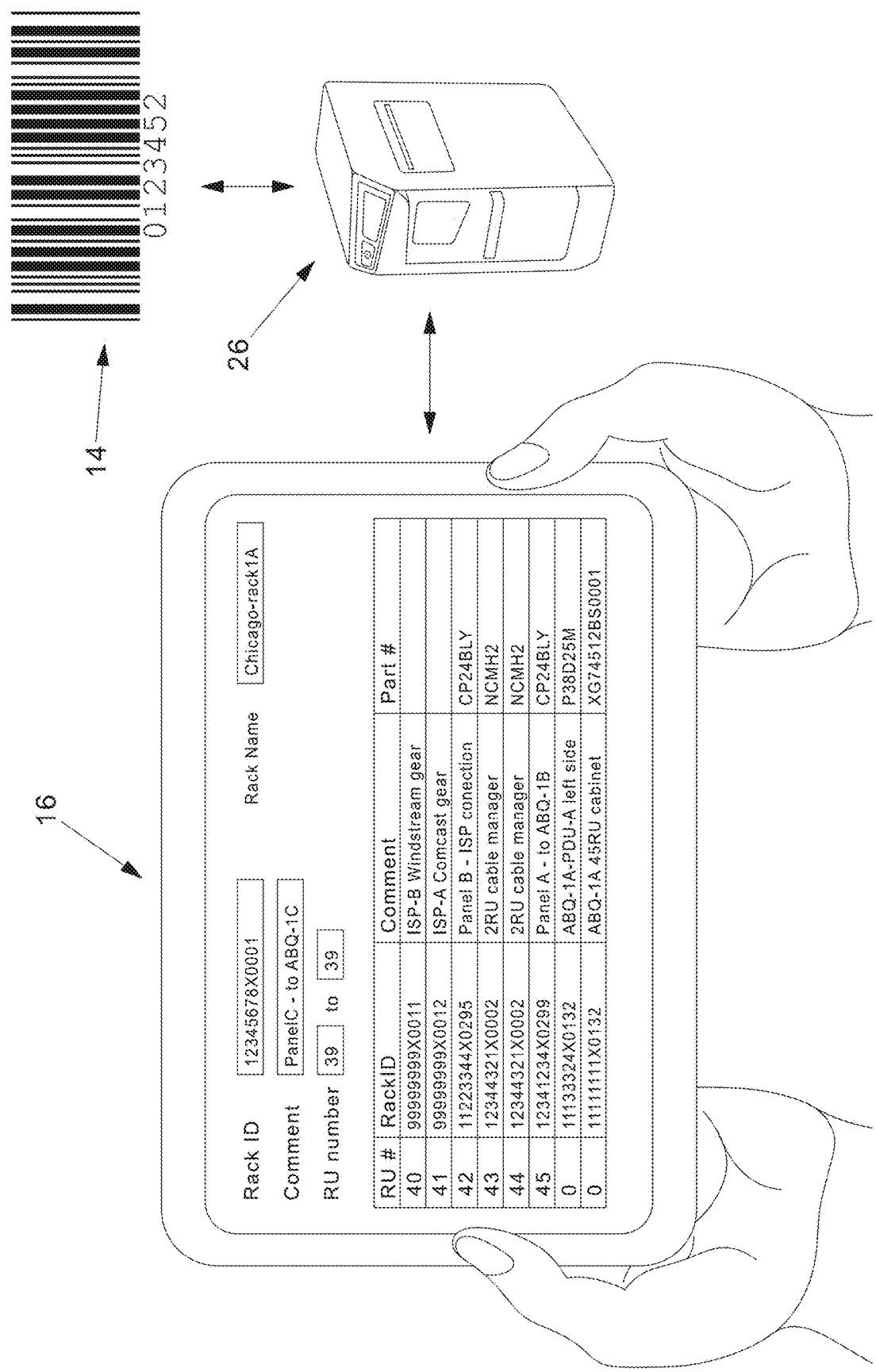
FIG. 8 illustrates an exemplary block diagram of a mobile computing device running exemplary application software for a cable management solution and printing an exemplary custom barcode label via an exemplary mobile label printer, according to a non-limiting exemplary embodiment of the present disclosure.

According to some embodiments, the system 100 may further include a mobile printer 26 for printing unique identifier labels, as shown in FIGS. 3 and 8. The mobile printer 26 enables a user to print labels with the unique identifier 14 while working in the field during an installation or maintenance work job.

Figure 11:
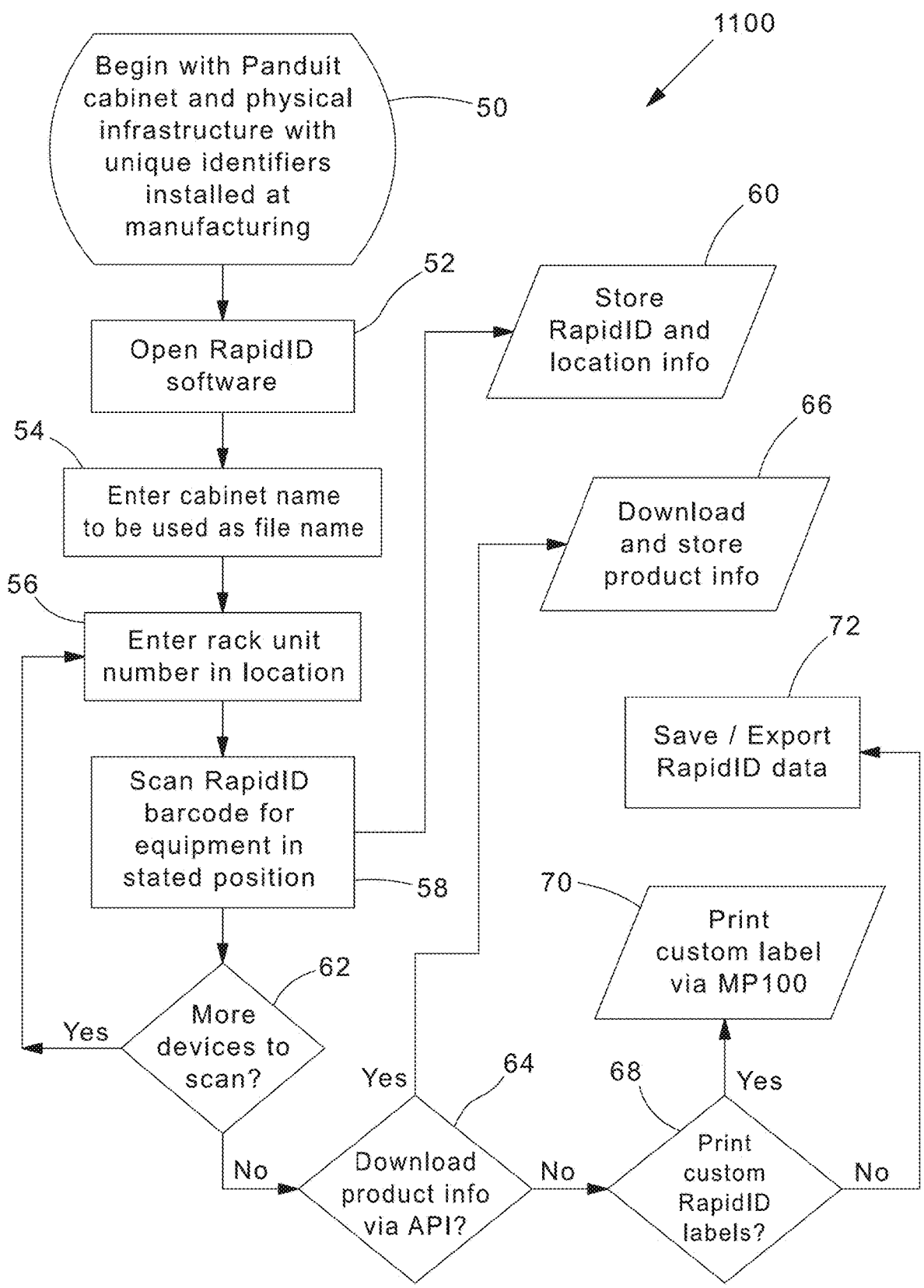
FIG. 11 illustrates an exemplary flowchart describing a process for performing an infrastructure "scan" mode operation, according to one a-limiting exemplary embodiment of the present disclosure.

FIG. 11 shows a flowchart 1100 including steps for implementing an exemplary process for documenting a cabinet, telecommunication rack, or other equipment by the equipment management solution, according to some embodiments. The process described by the flowchart 1100 may be referred to as a "Scan Mode", and include the following processes implemented by a processor executing instructions stored on a non-transitory memory included on a computing device (e.g., mobile computing device 16 as shown, for example, in FIG. 2):

Process 1 (50): Start or begin with an existing server cabinet or telecommunication rack that incorporates physical infrastructure parts with unique identifiers. In that regard, FIG. 1 illustrates exemplary telecommunication or data center infrastructure having a unique identifier 14 (e.g., barcode printed onto a label) according to one non-limiting exemplary embodiment of the present disclosure. As seen therein, a cabinet 10 may include infrastructure equipment 12, any or all of which may have a unique identifier 14 thereon or attached thereto via a label.

Figure 2:
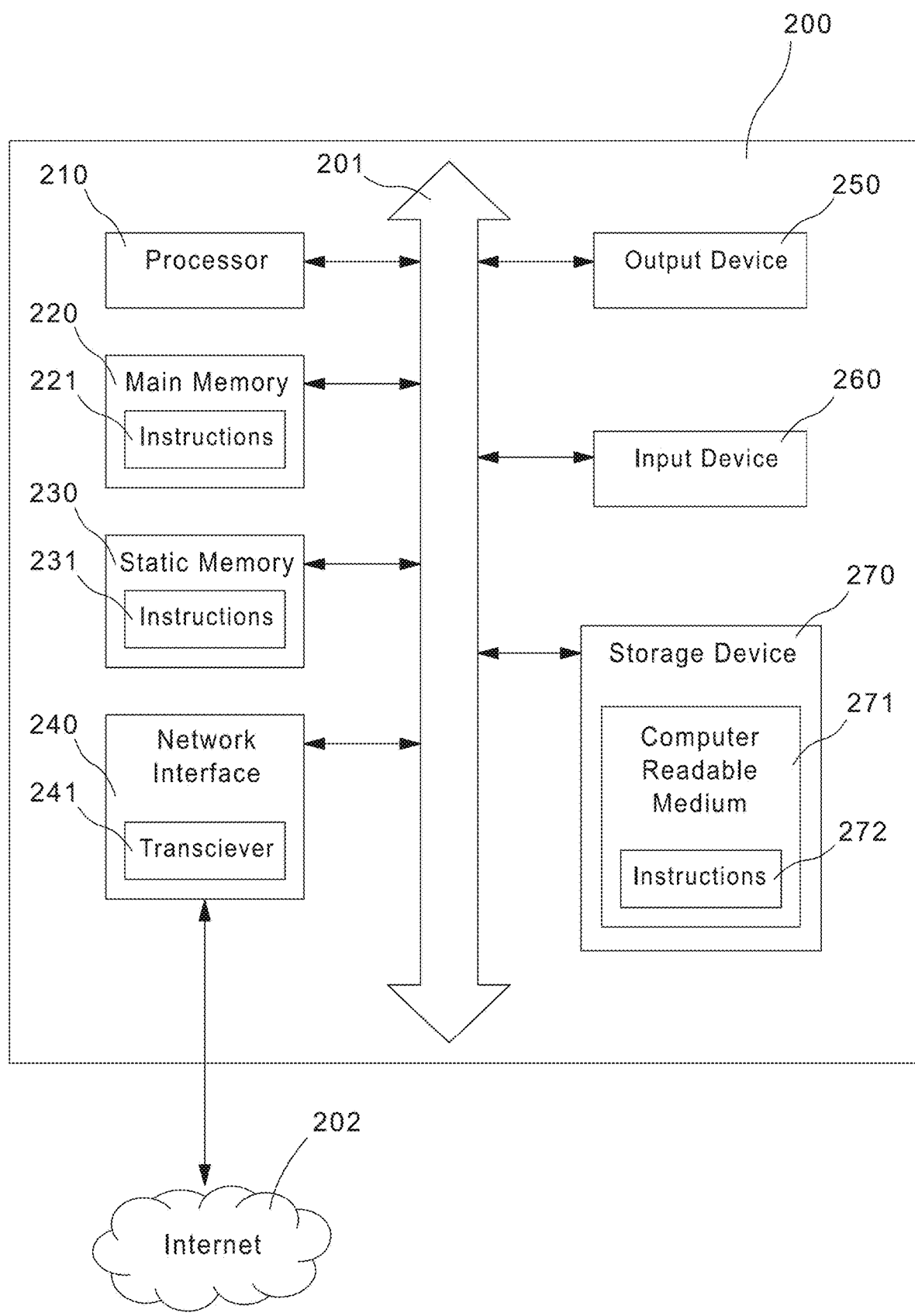
FIG. 2 illustrates a block diagram for an exemplary mobile computing device for running exemplary application software for cable management or data center infrastructure management, according to a non-limiting exemplary embodiment of the present disclosure.

Process 2 (52): A user initiates execution of the application software for the equipment management solution on the mobile computing device 16. For example, FIG. 2 depicts the mobile computing device 16 that may be executing the exemplary application software for the equipment management solution of the present disclosure.

Process 3 (54): The user enters a cabinet/rack name into a graphical user interface (GUI) field, where the name may be used as a file name for a saved file. In that regard, FIG. 4 illustrates an exemplary user entry of a cabinet/rack name into a field 18 of the GUI displayed by the equipment management solution of the present disclosure.

Process 4 (56): The user enters the rack unit number into the "Location" field provided by the GUI of the equipment management solution. In that regard, FIG. 5 illustrates an exemplary user entry of location/rack unit information into a location field 20 of the GUI displayed by the equipment management solution of the present disclosure.

Figure 6:
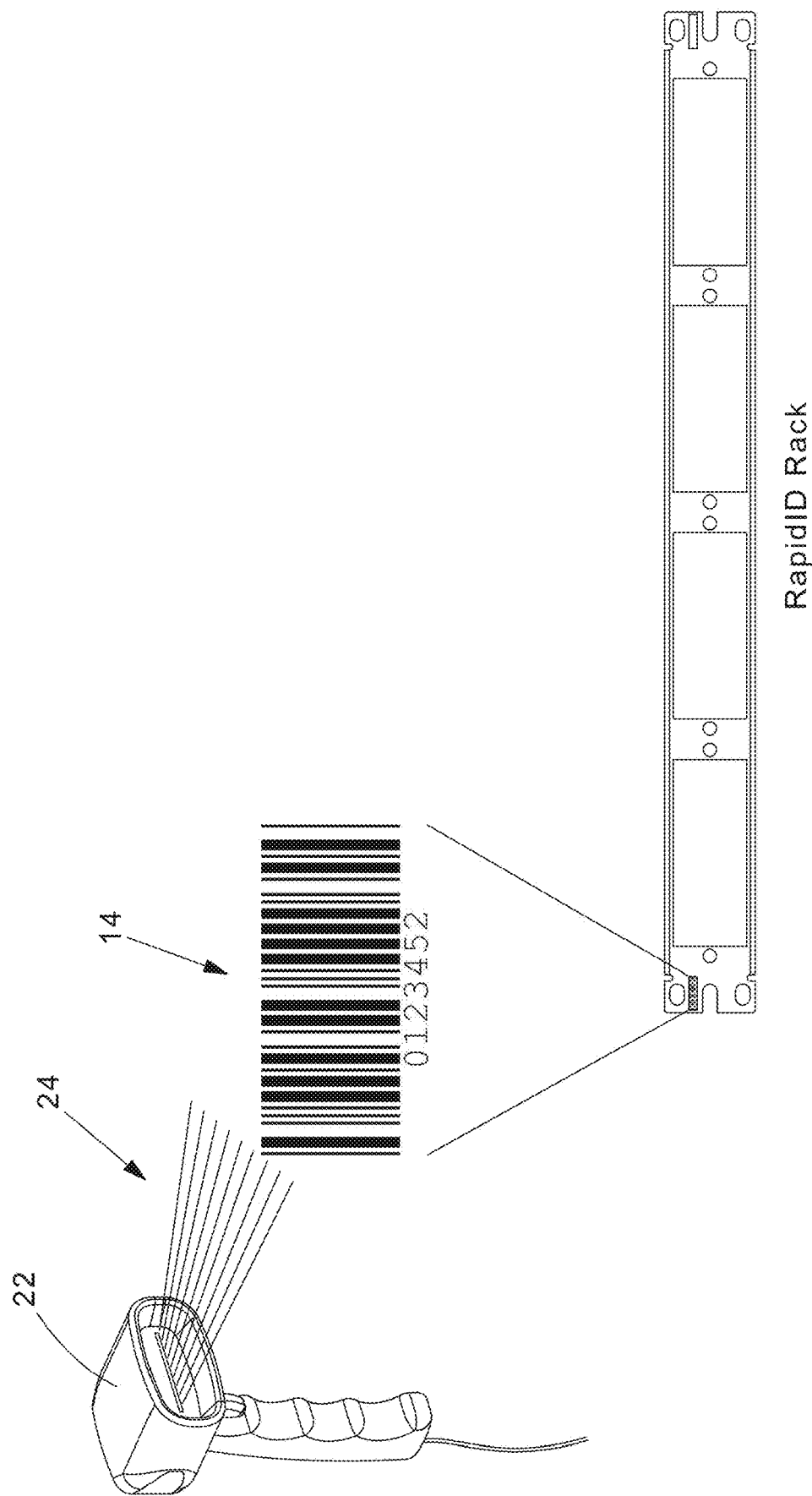
FIG. 6 illustrates an exemplary barcode scanner for scanning of a barcode identifier attached to a physical equipment, according to a non-limiting exemplary embodiment of the present disclosure.

Process 5 (58): The user scans the unique identification (ID) for each rack unit using the barcode scanner 22. In that regard, FIG. 6 illustrates the barcode scanner 22 being utilized by an exemplary user to scan 24 a barcode type of unique identifier 14 attached to a patch panel equipment. It is noted than any type of barcode scanner or any type of scannable code or other unique identifier may be employed.

Process 6 (60): While the user is scanning unique ID barcodes, the application software of the equipment management solution stores the cable identifier in a database along with cabinet/rack information and the location in the rack via rack unit number. The database may, for example, be stored on a memory storage unit included in the mobile computing device 16, or alternatively, the database may be stored on a remote data storage device that is separate from the mobile computing device 16. After storing the unique identifier 14 with the rack unit location information, the application software will then increment to the next rack unit number. If the incremented rack unit number is not correct, the user may enter the next rack unit number to scan. This process may be continued for more equipment until all devices in the cabinet/rack/location are scanned (62).

Figure 7:
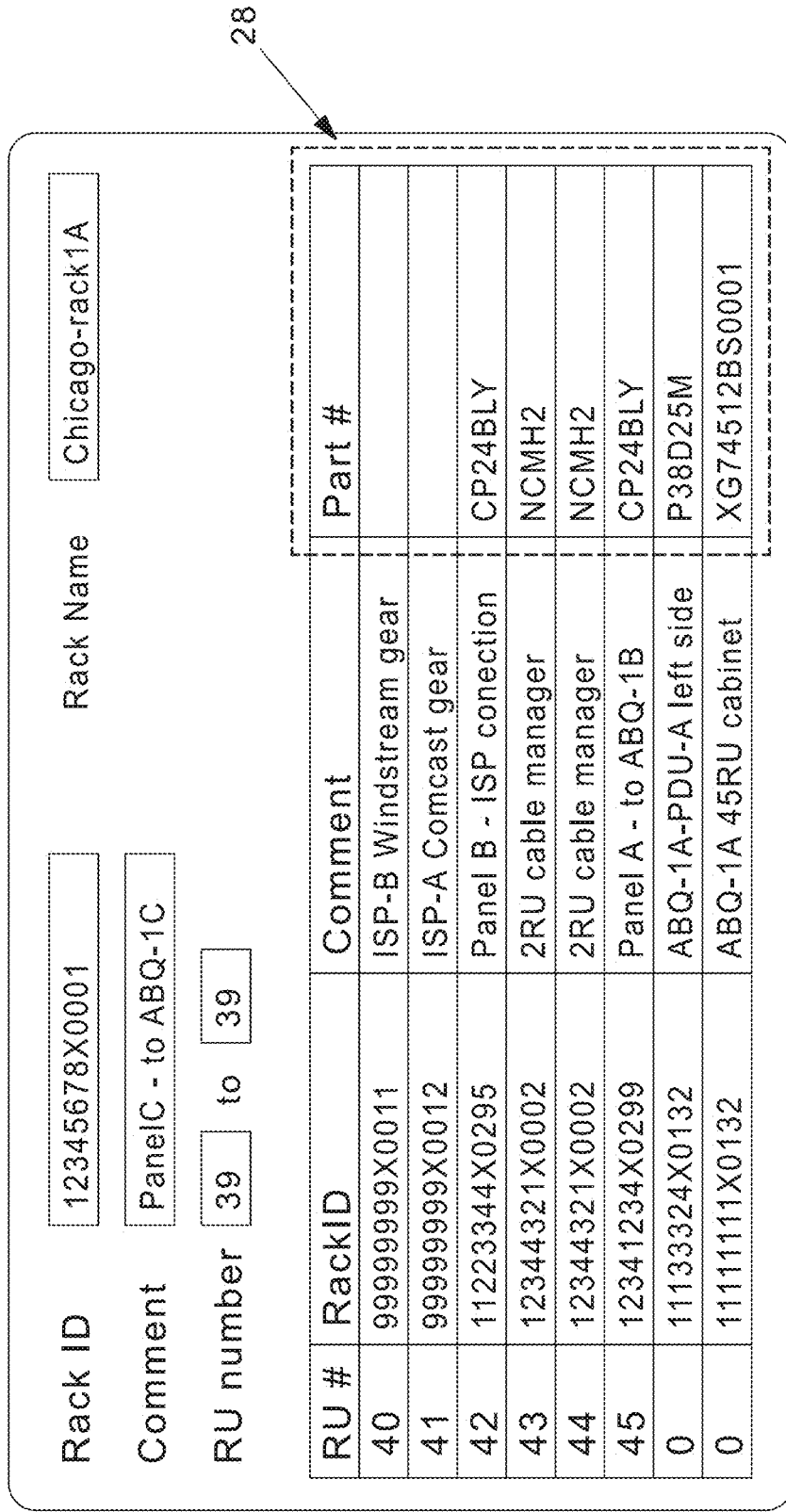
FIG. 7 illustrates an exemplary application software output of product information into a graphical user interface displayed on a display, according to a non-limiting exemplary embodiment of the present disclosure.

Process 7 (64): After devices, equipment, or components have been scanned and entered into the application software of the present disclosure, product information may be downloaded from an API Gateway to be associated with scanned information. This product information may include but is not limited to: Part Number, Module Type, Number of Slots, Panel Style, Height, Number of Outlets, Length, etc. (See, e.g., FIG. 7.) So, by employing an internet connection, the application software of the equipment management solution may enable and control the download and storing of specific product information via the API Gateway that communicates with an offsite portal (e.g., equipment manufacturer portal) that stores the product information (66). The application software of the present disclosure displays user-selected product information for each unique identifier and its associated location in its results, as shown in FIG. 7. In that regard, FIG. 7 illustrates product information (e.g., product part number) being input into product input fields 28 of the GUI displayed by the equipment management solution of the present disclosure. These location results along with product specific information can be saved or exported to an excel spreadsheet or a comma separated values file for import into DCIM systems or other management systems (72). (See, e.g., FIG. 9.)

Process 8 (68): The application software of the present disclosure may be utilized to determine when to print custom barcode labels. When the custom barcode labels are printed (70), a mobile printer 26 may be used for applying the custom printed labels to devices that are not supplied with pre-applied barcodes such as other equipment, servers, network switches, or the like type of equipment within a data center covered by the equipment management solution. In that regard, FIG. 3 depicts the mobile printer 26 according to one non-limiting exemplary embodiment of the present disclosure. FIG. 8 shows an exemplary block diagram of the mobile computing device 16 running the application software of the equipment management solution to print an exemplary custom unique identifier 14 onto a label via the mobile printer 26 according to one non-limiting exemplary embodiment of the present disclosure.

Figure 9:
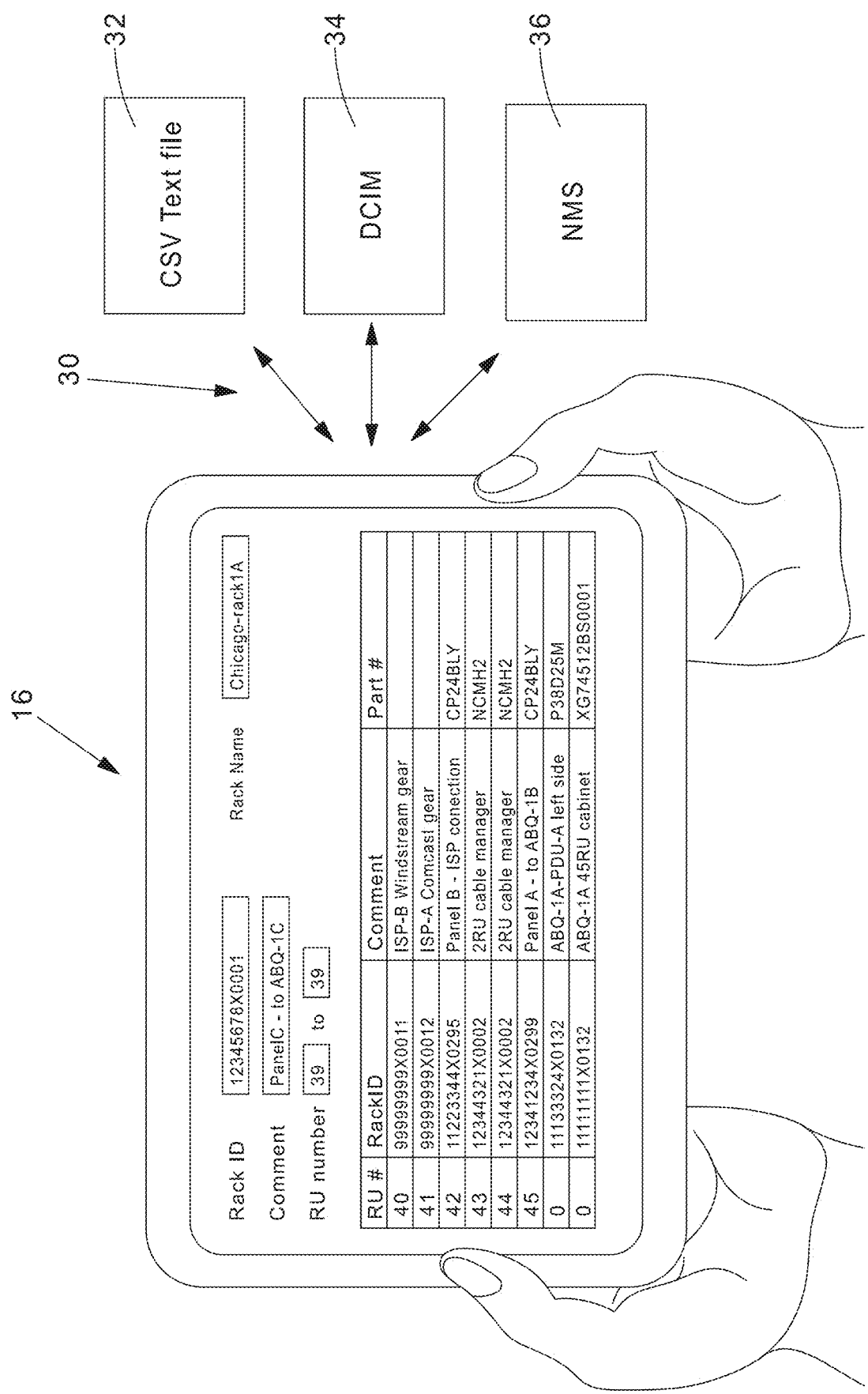
FIG. 9 illustrates an exemplary mobile computing device running exemplary application software for a cable management solution and exporting results data to an exemplary file, a data center infrastructure management (DCIM) system, and/or a network management system (NSM), according to a non-limiting exemplary embodiment of the present disclosure.

Process 9 (72): When all equipment in the rack has been scanned and API information has been downloaded, the application software of the present disclosure can export and/or save information via comma separated value text file (.csv file) 32 or other format to a network management system (NMS) 36 or a DCIM system 34, as shown in FIG. 9. In that regard, FIG. 9 depicts the mobile computing device 16 running the application software for the equipment management solution to export 30 results data to an exemplary csv file 32, a NMS 36, and/or a DCIM system 34 according to one non-limiting exemplary embodiment of the present disclosure. For example, the results data may be sent, received, or otherwise utilized by the DCIM system 34 to implement the DCIM features described herein.

Figure 12:
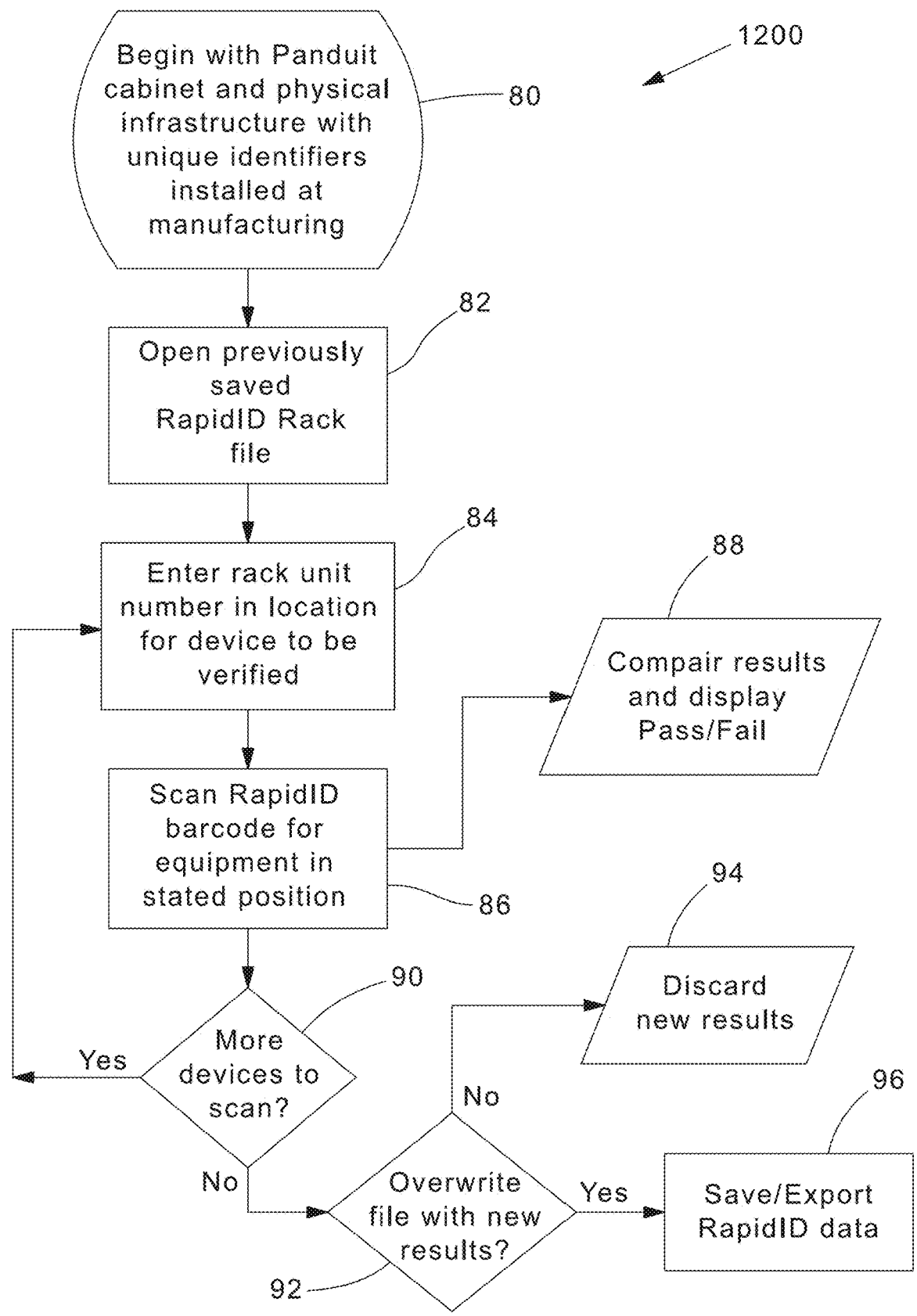
FIG. 12 illustrates an exemplary flowchart describing a process for performing an infrastructure "verify" mode operation, according to a non-limiting exemplary embodiment of the present disclosure.

FIG. 12 shows a flowchart 1200 including steps for implementing an exemplary process for validating/verifying an existing installation by the equipment management solution, according to some embodiments. The process described by the flowchart 1200 may be referred to as a "Verify Mode", and include the following processes implemented by a processor executing instructions stored on a non-transitory memory included on a computing device (e.g., mobile computing device 16 as shown, for example, in FIG. 2):

Process 1 (80): After beginning with an existing server cabinet or telecommunication rack that incorporates physical infrastructure parts with unique identifiers, a user opens a previously saved file with existing location information and unique identifiers (82).

Process 2 (84): The user enters the rack unit location of the device to be verified. In that regard, FIG. 5 shows a user entering rack unit locations into the location field 20 in the GUI displayed by the software application of the equipment management solution.

Process 3 (86): The user scans the unique identifier printed on a label on a device in a selected rack unit. The software application is then configured to compare the current identifier value against the database of the previously scanned results to give a PASS/FAIL notification (88). If the device information in the current location matches the device information in the database, a PASS status is reported. If the current device information does not match the database record, a FAIL status is reported. Such a FAIL status also reports the last recorded identifier for that location. In that regard, FIG. 10 illustrates exemplary application software output of results displayed in a GUI of a "verify" mode operation according to one non-limiting exemplary embodiment of the present disclosure, showing a visual indication for PASS status (e.g., rows 41, 42-45) and a different visual indication for a FAIL status (e.g., row 42).

This process may be continued until all devices in the cabinet/rack are scanned (90). A user may also determine or decide whether to overwrite the previously saved file with any new results from the verification scan (92), or alternatively discard any such new results (94). In the event of an overwrite, the new results along with product specific information can be saved or exported to an excel spreadsheet or a comma separated values file for import into DCIM or other management systems (96).

Figure 24:
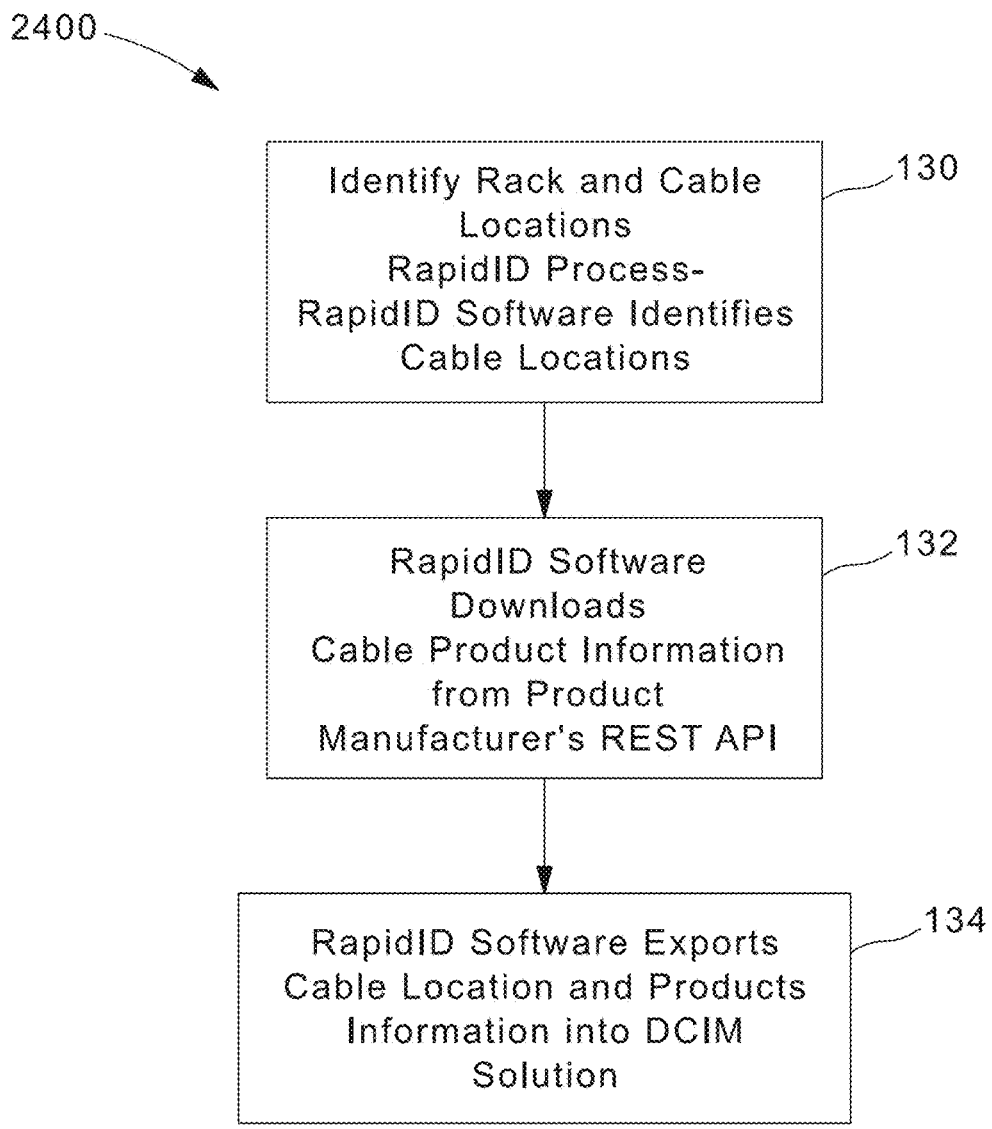
FIG. 24 illustrates a flowchart describing an exemplary method of documenting equipment and cable infrastructure locations and inputting product information, according to a non-limiting exemplary embodiment of the present disclosure.
Figure 25:
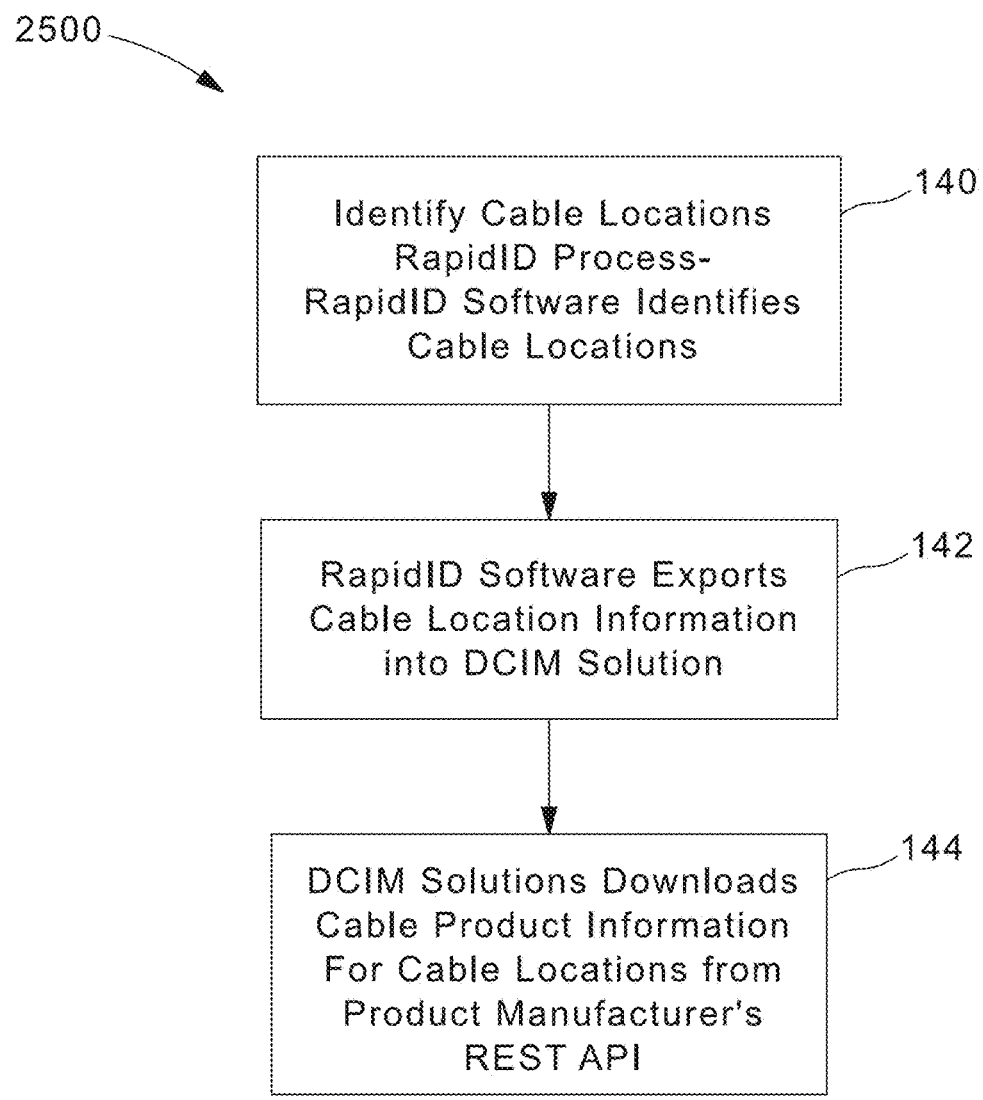
FIG. 25 illustrates a flowchart describing another exemplary method of documenting equipment and cable infrastructure locations and inputting product information, according to a non-limiting exemplary embodiment of the present disclosure.

FIG. 24 shows a flowchart 2400 illustrating an exemplary method of documenting equipment and cable infrastructure locations and inputting product information according to a non-limiting exemplary embodiment of the equipment management solution. FIG. 25 shows a flowchart 2500 illustrating another exemplary method of documenting equipment and cable infrastructure locations and inputting product information according to a non-limiting exemplary embodiment of the equipment management solution.

As described by flowchart 2400 and/or flowchart 2500, the software application of the equipment management solution running on the mobile computing device 16 may be used in conjunction with unique barcode identifiers attached to physical infrastructure products to identify and record location information (130, 140). By utilizing these features in the software application, this reduces, or even eliminates, manual data entry into a DCIM system and the software application can further be utilized to look up product specific information from a product manufacturer's public facing API gateway (which may include and/or may also be referred to as a remote database).

API product information from a product manufacturer's API gateway may be downloaded by the application software of the equipment management solution (132) and exported to the DCIM solution (134), or exported to the DCIM solution first (142) and then the DCIM solution will handle downloading the product information from the product manufacturer's API gateway (144). Both methods described by flowchart 2400 and flowchart 2500 may be utilized and/or be interchangeable as they both provide the same result of the DCIM solution having API product information for physical infrastructure products without the need to manually enter the same data. In that regard, it is noted that the mobile computing device 16 may include a communication unit (e.g., network interface 240) for transmitting and/or receiving wireless or wired signals for communicating over any suitable communication system or systems with a scanner, API, DCIM, or any other unit, controller, device, component, mechanism, module, system, subsystem, gateway, application, software, solution or the like, which communication system or systems may include Bluetooth, Wi-Fi, RF, cellular, internet, telecommunication, and/or any other wireless or wired communication system or systems.

Once equipment and connection data for a physical location has been collected by the application software of the equipment management solution running on the mobile computing device 16, results data can be exported to the DCIM solution running on the DCIM system for analysis, inventory reporting, and documentation. These application results may include but are not limited to: equipment location, equipment type, equipment specific manufacturing information (e.g., for PDU: number of outlets, outlet type, power rating, plug type, certifications, image of product), cable end locations for network cables, cable end locations for power cables, cable specific manufacturing information (e.g., for network cable: cable type, cable length, connector type, cable color, cable rating, images of product, etc.)

Figure 26:
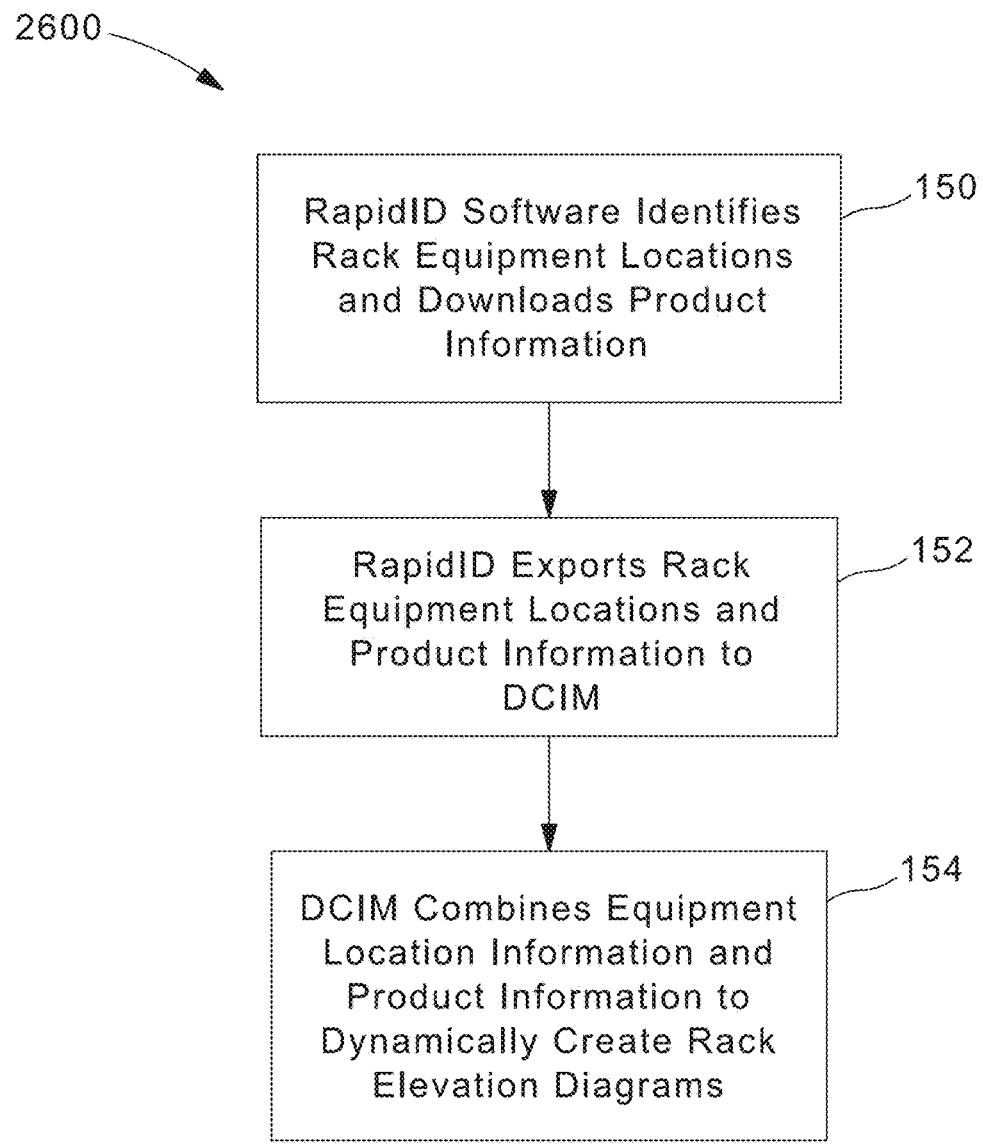
FIG. 26 illustrates a flowchart describing an exemplary method to dynamically create rack elevation diagrams, according to a non-limiting exemplary embodiment of the present disclosure.

FIG. 26 shows a flowchart 2600 describing an exemplary process to dynamically create rack elevation diagrams according to one non-limiting exemplary embodiment of the present disclosure. As described by the flowchart 2600, the equipment management solution imports (e.g., downloads) the above-noted results data including the product information (150), and then exports this results data to the DCIM solution (152).

Once the results data is received, the DCIM solution is enabled with the information to dynamically build or create rack elevation and connectivity diagrams with detailed product information (154). This provides a more efficient DCIM solution that does not require the DCIM user to look up and manually enter the same data for creating these diagrams. In this way, the equipment management solution described herein eliminates the need for manual data entry and provides a method to automatically create rack elevation diagrams with detailed product information for documenting data center physical infrastructure installations.

In yet another non-limiting exemplary embodiment of the present disclosure, the DCIM solution can combine individual cable location result files together from the equipment management solution to dynamically create end-to-end network channel and power chain documentation. In that regard, a DCIM solution can correlate product information about individual components downloaded from an API gateway to provide information about end-to-end network channels and power chains such as overall channel length and performance.

Figure 27:
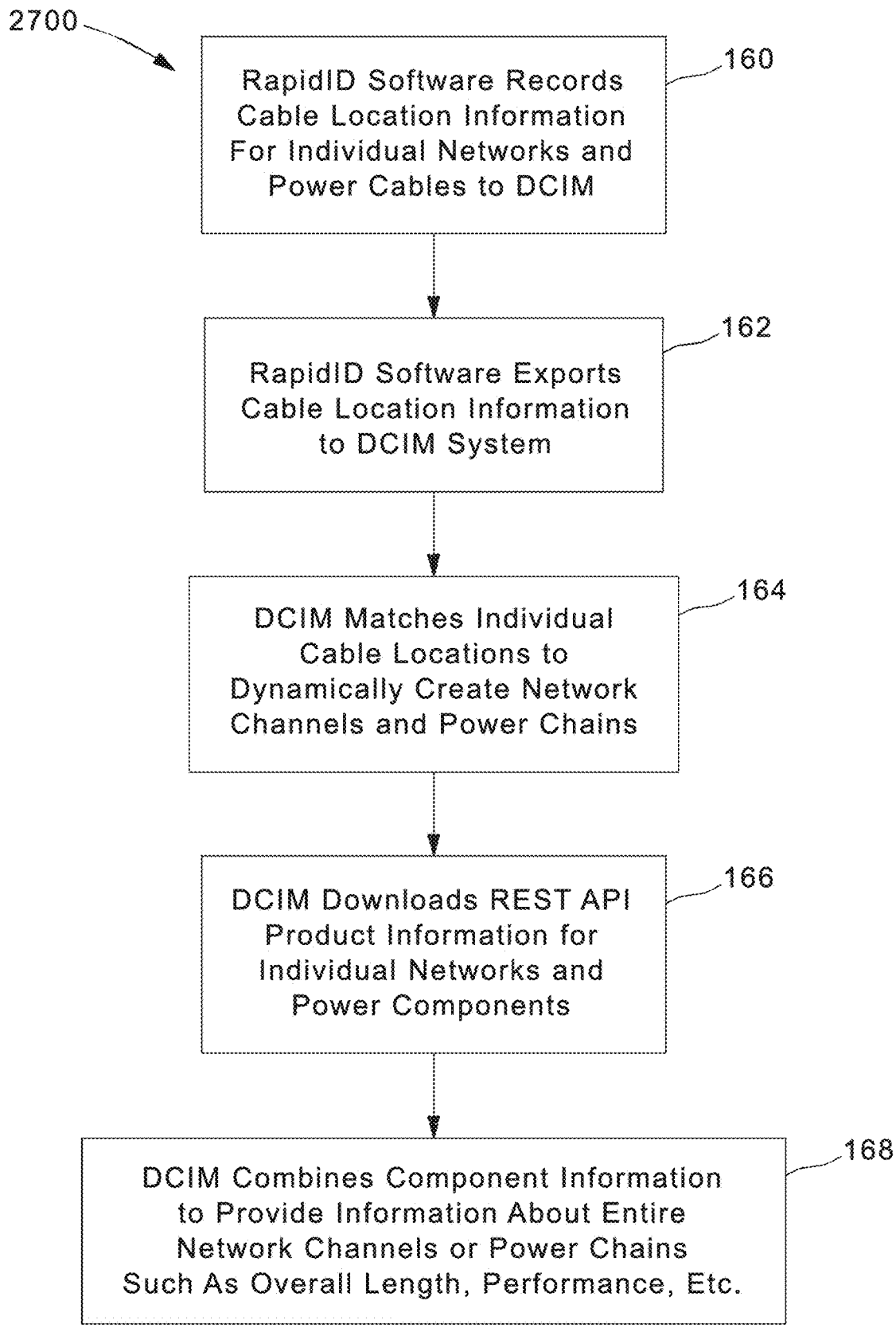
FIG. 27 illustrates a flowchart describing an exemplary method to dynamically create an end-to-end network channel and power chain with product information, according to a non-limiting exemplary embodiment of the present disclosure.

FIG. 27 shows a flowchart 2700 describing an exemplary process to dynamically create an end-to-end network channel and power chain with product information according to one non-limiting exemplary embodiment of the present disclosure. As seen therein, the equipment management solution identifies and documents network and power connectivity locations and cable information (160), as well as then exports such cable location information to the DCIM solution (162).

Upon receiving this information from the equipment management solution, the DCIM solution maps network connections and can join individual connection links to create full network channel or power chain mappings of all connections that make and end-to-end network channel (164).

Figure 17:
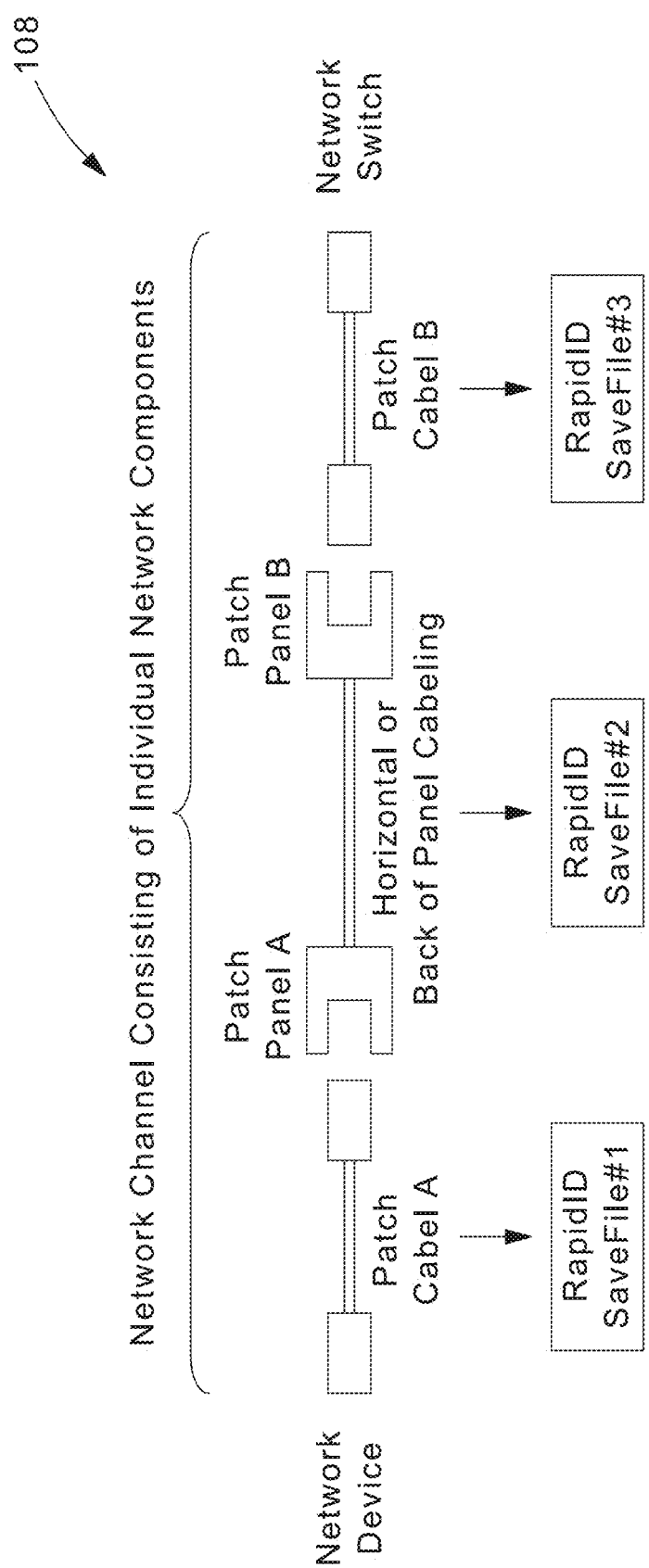
FIG. 17 illustrates an exemplary network channel comprised of individual infrastructure components for use with non-limiting exemplary embodiments of the present disclosure.
Figure 18:
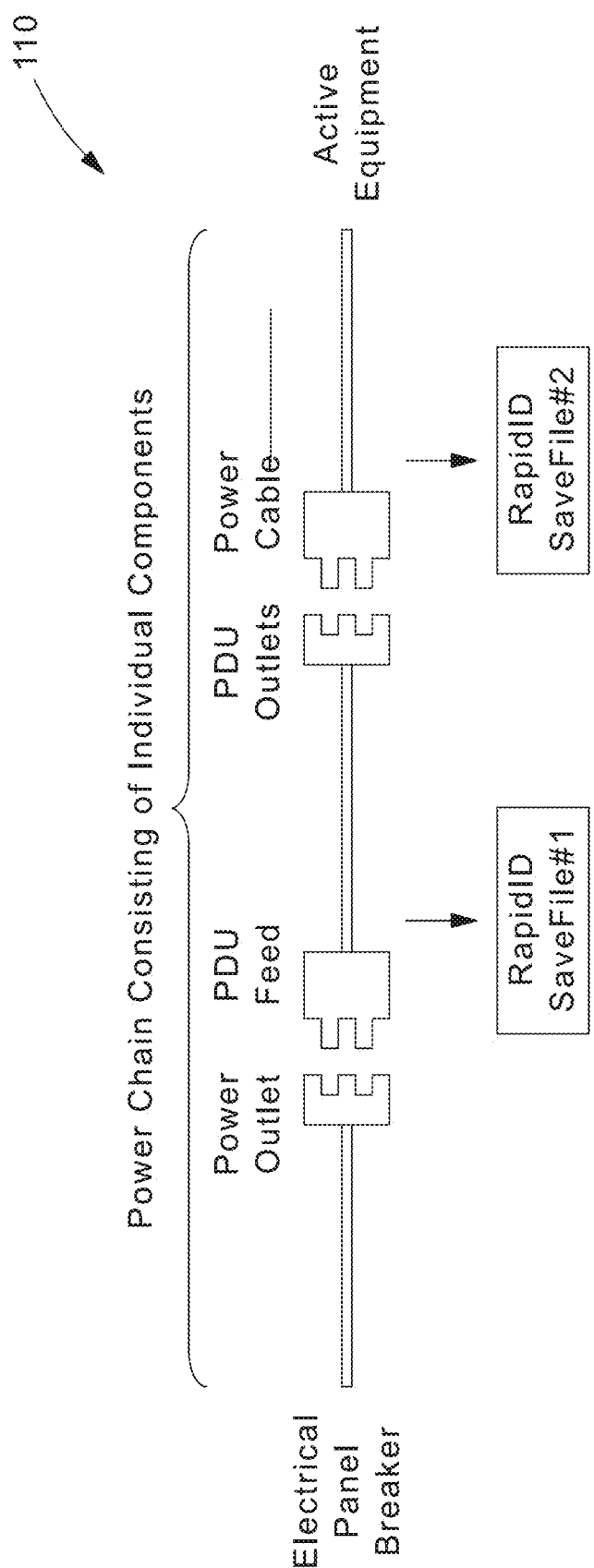
FIG. 18 illustrates an exemplary electrical power chain comprised individual infrastructure components for use with non-limiting exemplary embodiments of the present disclosure.

Using API product information downloaded from the manufacturer (166), the DCIM solution may use cable specific information (e.g., lengths or performance of individual cables comprising a channel) to provide lengths or performance of the entire cable channel as a whole (168). Currently DCIM systems require this connectivity location data and product information to be manually entered. In that regard, FIG. 17 illustrates an exemplary network channel 108 comprised of individual infrastructure components for use with non-limiting exemplary embodiments of the present disclosure, and FIG. 18 illustrates an exemplary electrical power chain 110 comprised individual infrastructure components for use with non-limiting exemplary embodiments of the present disclosure.

Figure 28:
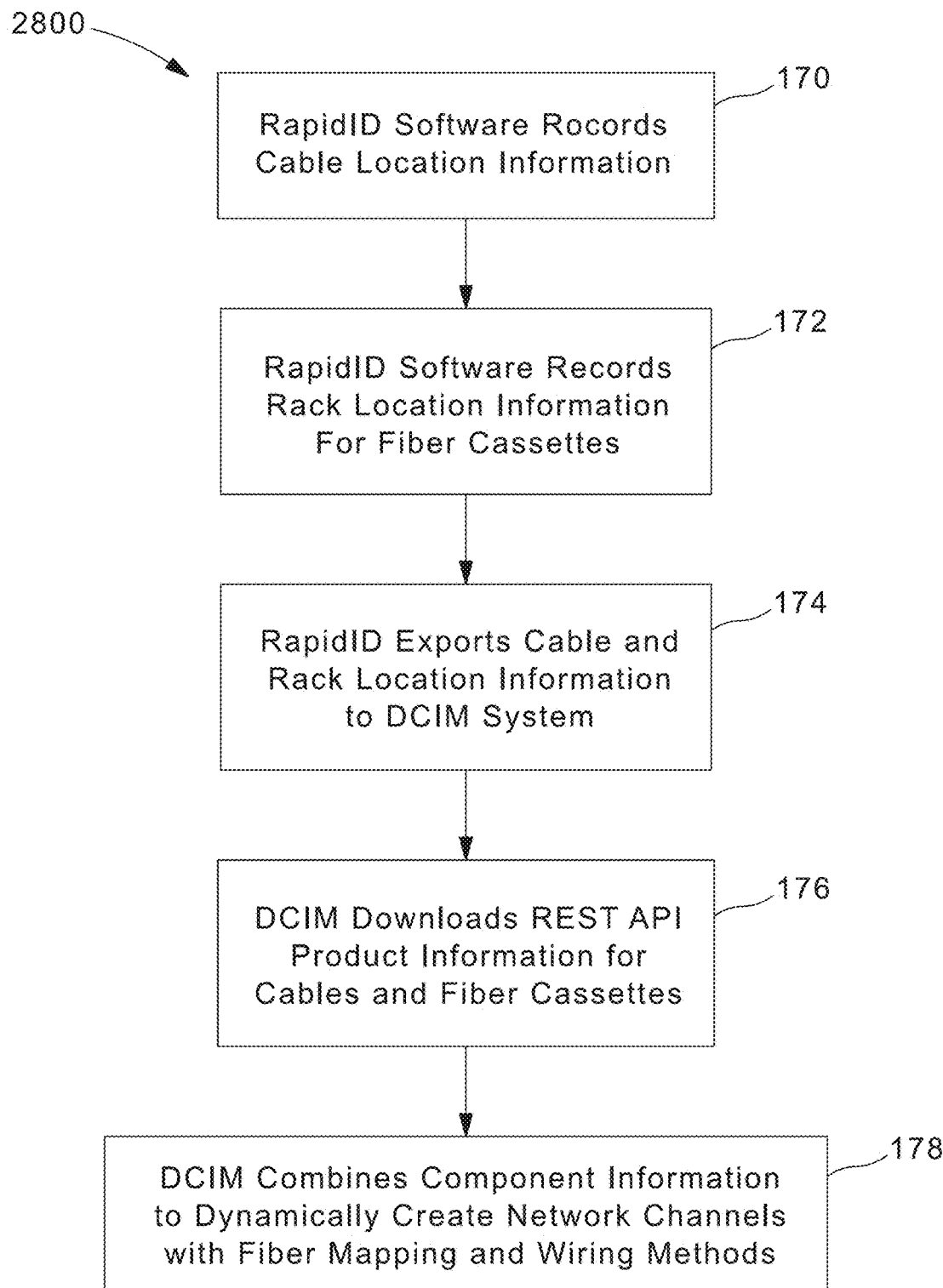
FIG. 28 illustrates a flowchart describing an exemplary method to dynamically create end-to-end network channels with fiber mapping and wiring method information, according to a non-limiting exemplary embodiment of the present disclosure.

In a further non-limiting exemplary embodiment of the present disclosure, a DCIM solution is configured to correlate cable connectivity information and component wiring method information provided by the application software of the cable management solution disclosed herein with product information downloaded from a manufacturer's API gateway to automatically generate cabling diagrams with fiber and channel mapping in advanced network cabling scenarios that consist of one-to-many components. FIG. 28 shows a flowchart 2800 describing an exemplary process to dynamically create end-to-end network channels with fiber mapping and wiring method information according to one non-limiting exemplary embodiment of the present disclosure.

Figure 13:
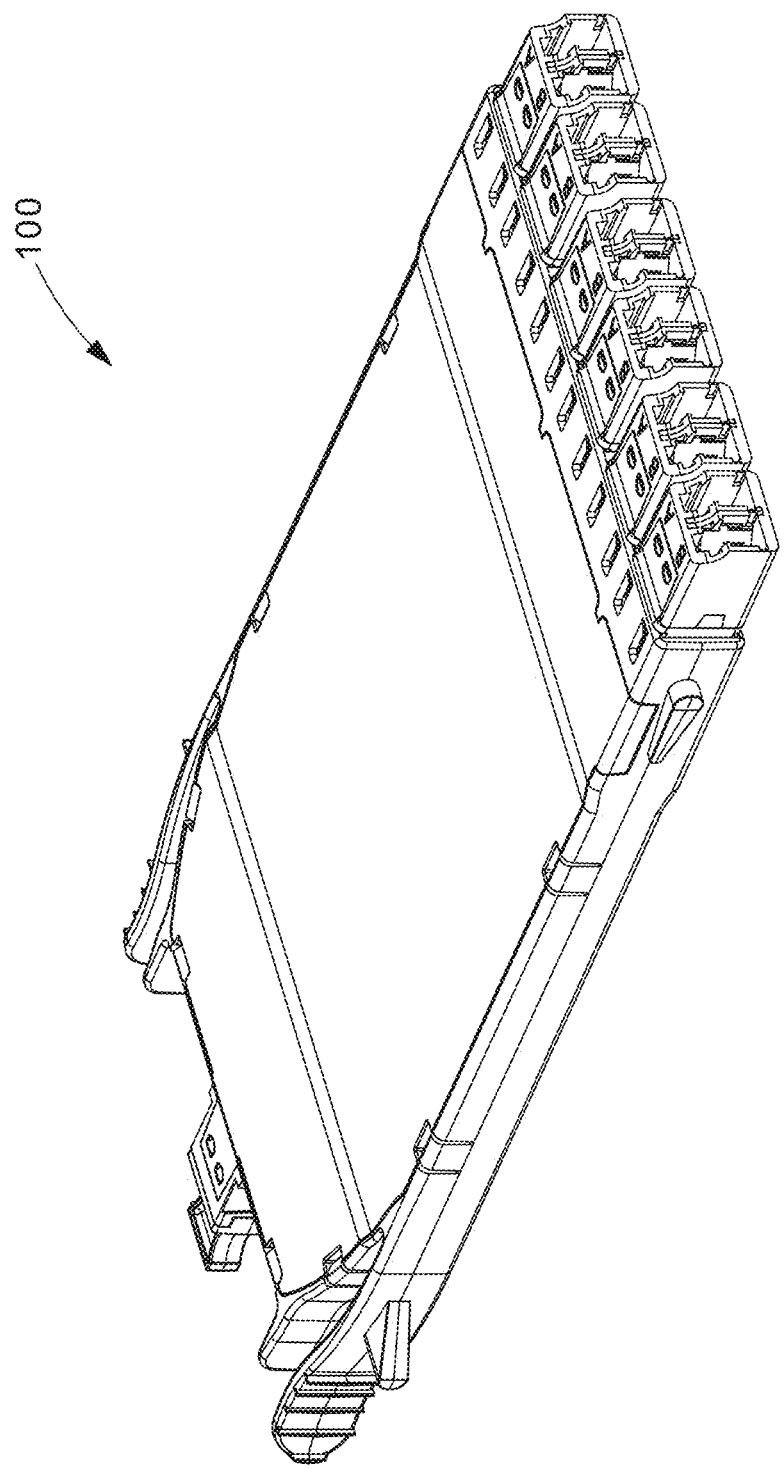
FIG. 13 illustrates a perspective view of an exemplary fiber cassette for use with non-limiting exemplary embodiments of the present disclosure.

In that regard, advanced network cabling scenarios may utilize one-to-many physical cabling solutions which require additional information about the product and the wiring method to provide accurate fiber or channel mapping in a solution. Some examples where one-to-many connectivity products require connection snapping information about a device may include but are not limited to:

1. Multiple LC patch cables are combined into one multi-fiber push on (MPO) (e.g., MTP) fiber trunk via fiber cassette 100. In that regard, FIG. 13 shows a perspective views of an exemplary fiber cassette 100 for use with non-limiting exemplary embodiments of the present disclosure.

Figure 14:
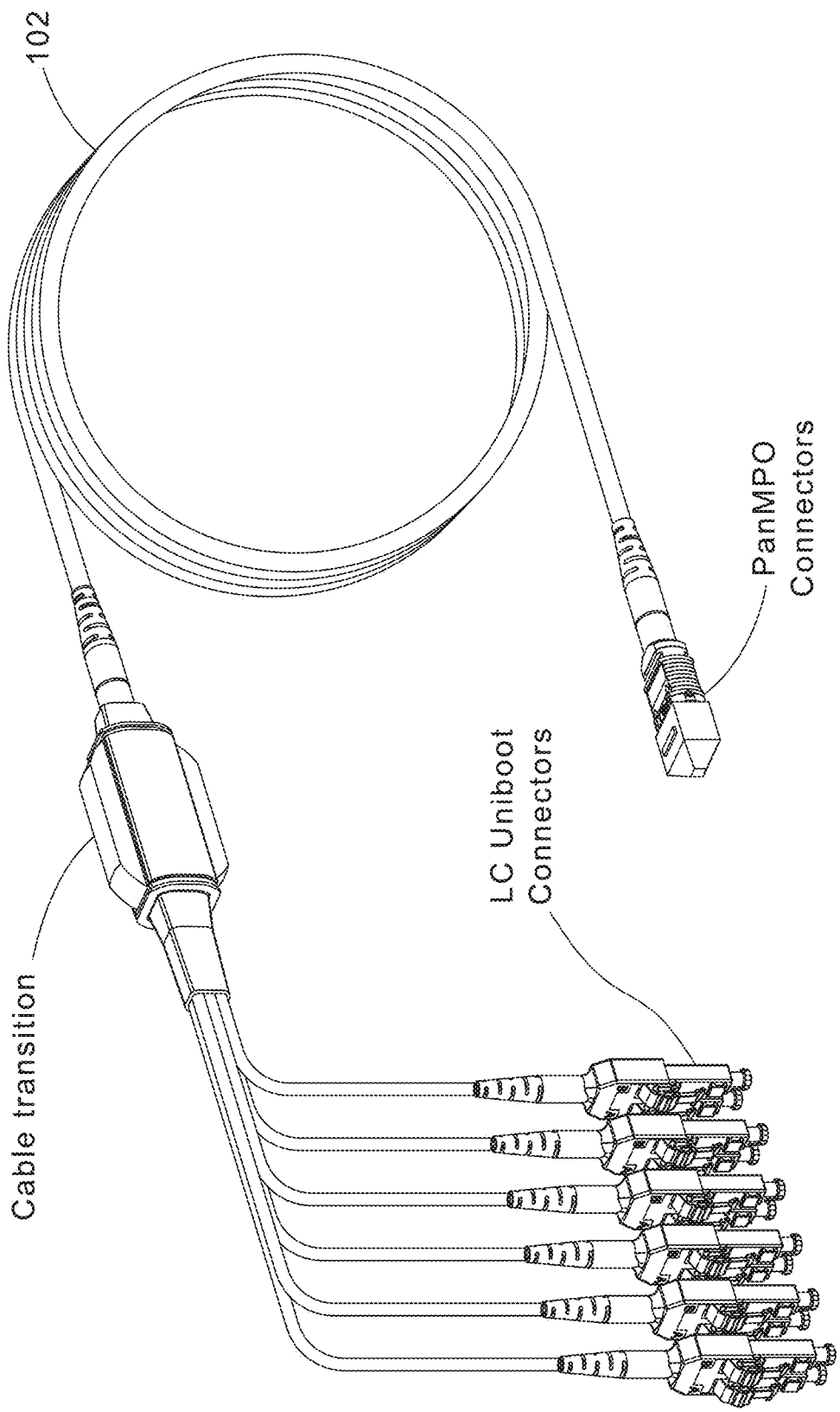
FIG. 14 illustrates a perspective view of an exemplary wiring harness for use with non-limiting exemplary embodiments of the present disclosure.

2. Multiple LC patch cables are combined into one MPO/MTP fiber trunk via harness cable 102. In that regard, FIG. 14 illustrates a perspective view of an exemplary wiring harness 102 for use with non-limiting exemplary embodiments of the present disclosure.

3. Multiple copper connections connect to a plug pack.

Figure 15:
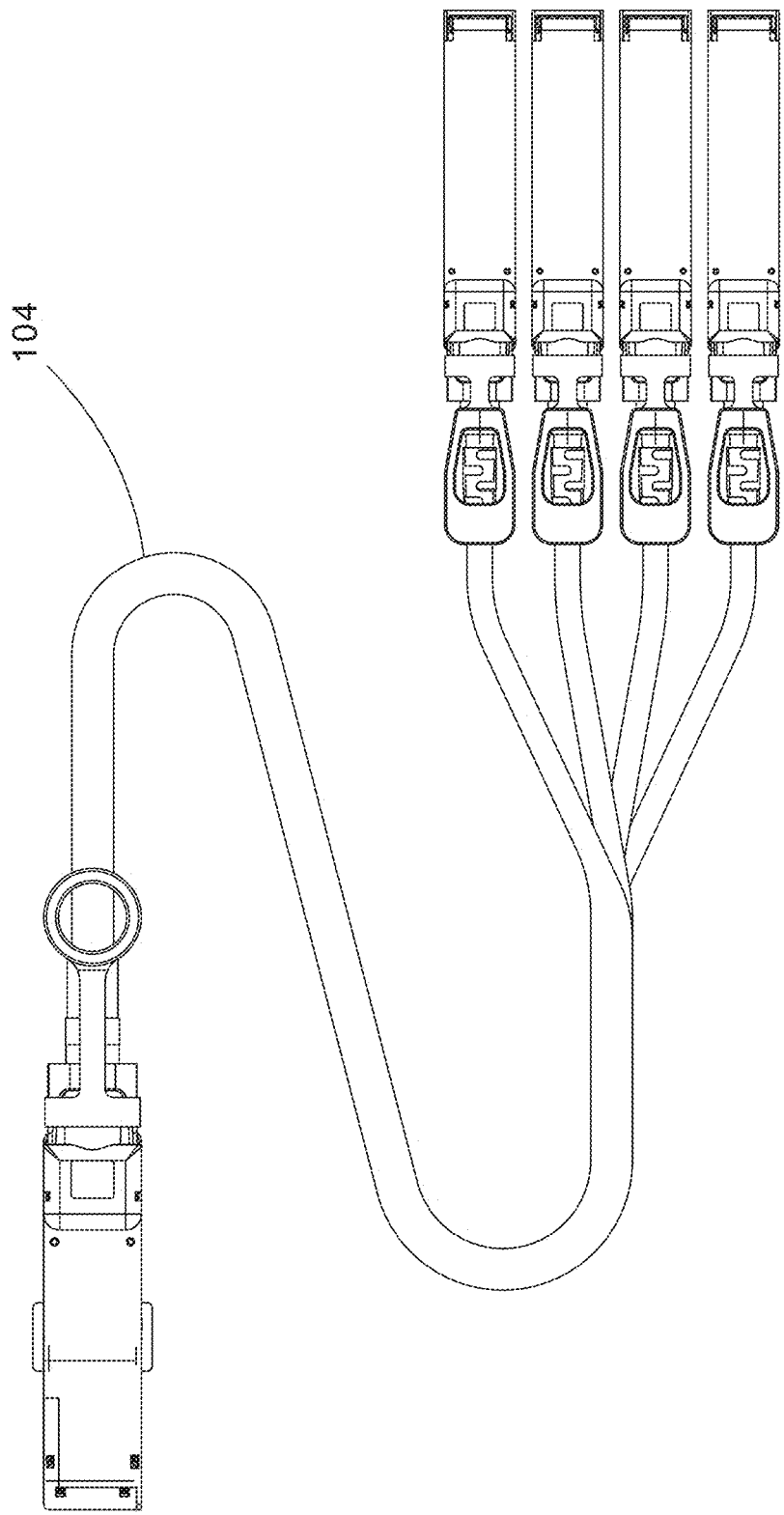
FIG. 15 illustrates a top view of an exemplary optical breakout cable for use with non-limiting exemplary embodiments of the present disclosure.

4. One small form factor pluggable plus (SFP) cable/direct attach cable (DAC)/active optical cable (AOC) connector breaks out to multiple SFP/AOC/DAC connectors via breakout cable 104. FIG. 15 illustrates a top view of an exemplary optical breakout cable 104 for use with non-limiting exemplary embodiments of the present disclosure.

Figure 19:
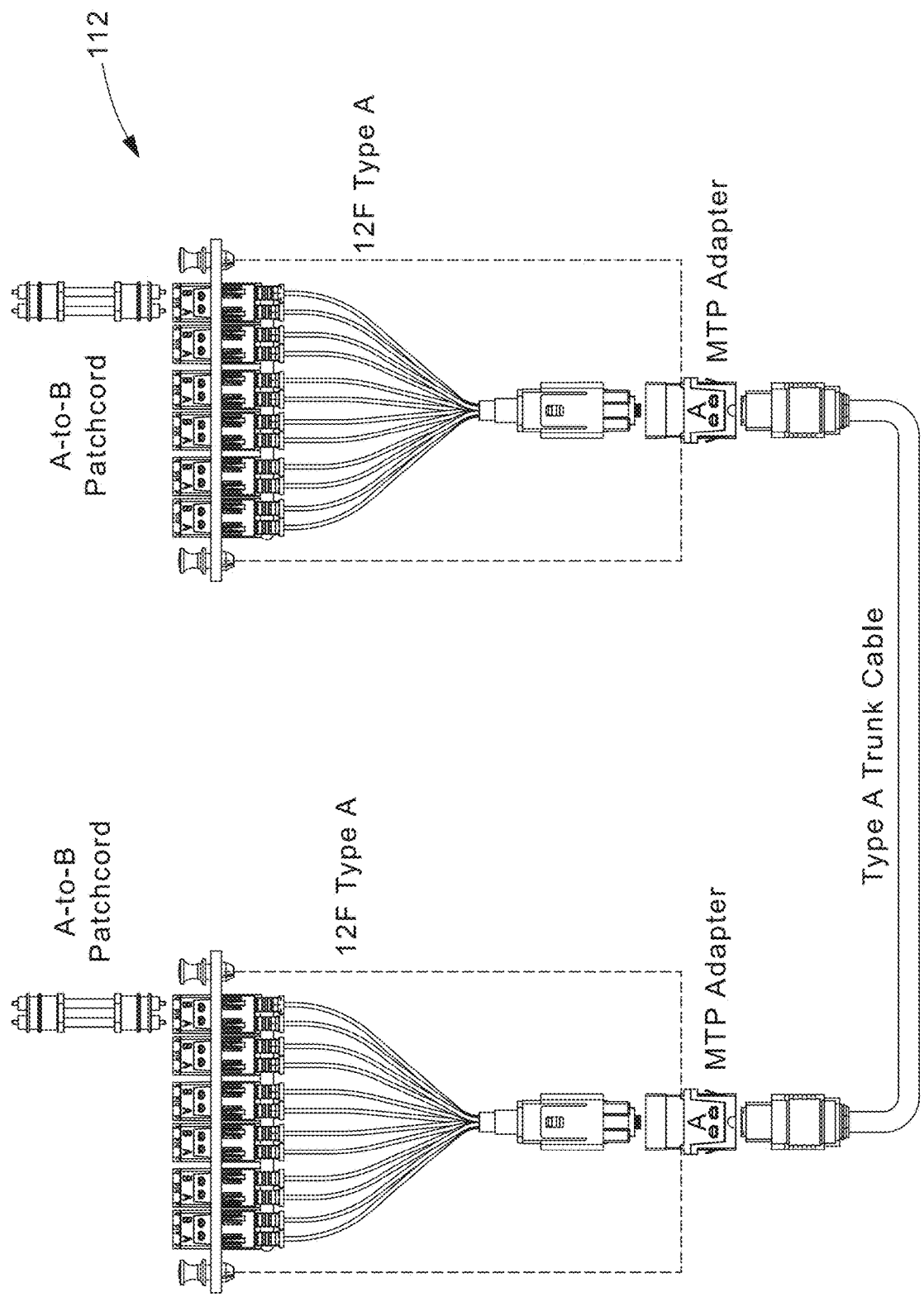
FIG. 19 illustrates an exemplary method for wiring a connector to a fiber cassette for use in non-limiting exemplary embodiments of the present disclosure.

In these advanced cabling scenarios, a DCIM solution must know the wiring method to properly map fibers or channels as they traverse one-to-many network devices. In that regard, FIG. 16 shows a table illustrating wiring methods 106 for a fiber cassette for use with non-limiting exemplary embodiments of the present disclosure, and FIG. 19 shows an exemplary method 112 for wiring a connector to a fiber cassette for use in non-limiting exemplary embodiments of the present disclosure.

Figure 20:
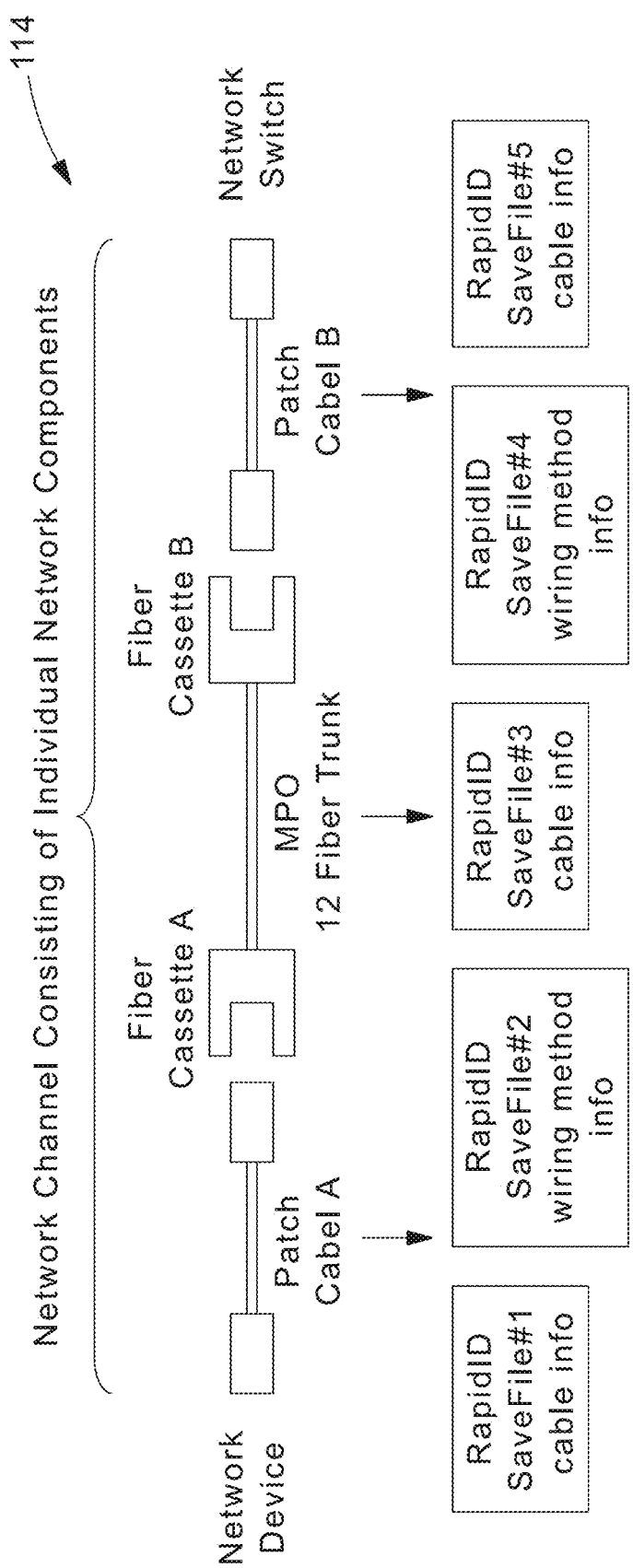
FIG. 20 illustrates dynamically created fiber mapping using results of an exemplary software application, according to a non-limiting exemplary embodiment of the present disclosure.

According to the present disclosure, the application software of the equipment management solution can scan a unique identifier on a one-to-many type wiring component to document its physical location and can use the unique identifier with a public facing API to download product knowledge of its wiring method. The wiring method information of a component can be combined with a component's associated connections to automatically create end-to-end network channel connectivity maps with fiber mapping and wiring method information. In that regard, FIG. 20 illustrates dynamically created fiber mapping 114 using results of an exemplary software application according to one non-limiting exemplary embodiment of the present disclosure.

As described by the flowchart 2800 shown in FIG. 28, the application software of the equipment management solution identifies and documents cable location information (170) as well as rack unit location information for fiber cassettes (172), and exports such location information to the DCIM solution (174). Using product information for cables and fiber cassettes downloaded via manufacturers API gateways (176), the DCIM solution combines component information with fiber mapping and wiring methods information to dynamically create an end-to-end network channel (178).

Figure 29:
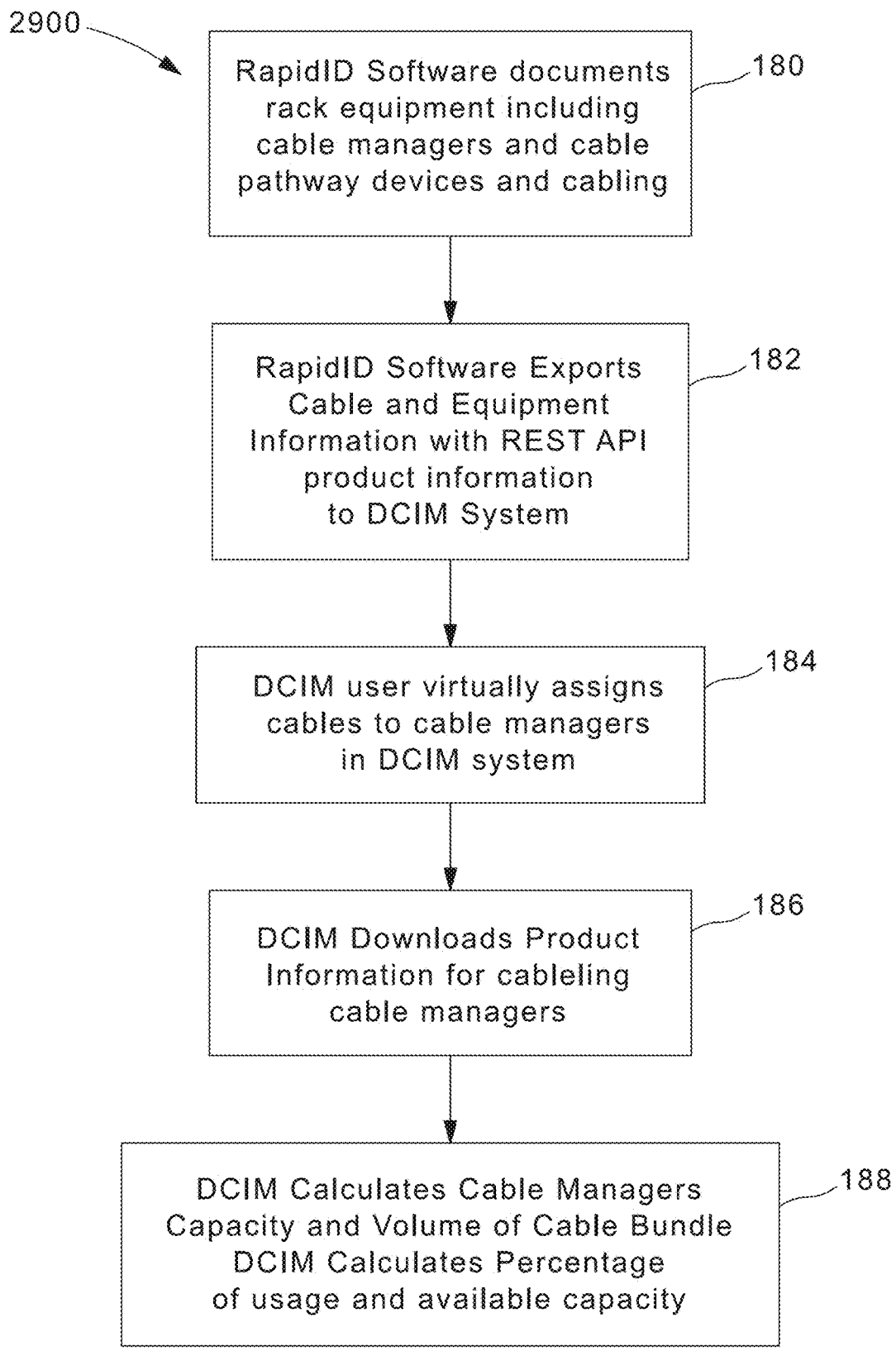
FIG. 29 illustrates a flowchart describing an exemplary method to dynamically calculate cable capacity according to one non-limiting exemplary embodiment of the present disclosure.

In another non-limiting exemplary embodiment of the present disclosure, the DCIM solution is configured to calculate a cable routing product's usage percentage or capacity for new cables based on cable assignment information inputted by user, cable and rack location information imported from the application software of the equipment management solution disclosed herein, and product information downloaded from a manufacturers' API. FIG. 29 shows a flowchart 2900 illustrating an exemplary process to dynamically calculate cable capacity according to one non-limiting exemplary embodiment of the present disclosure.

Figure 21:
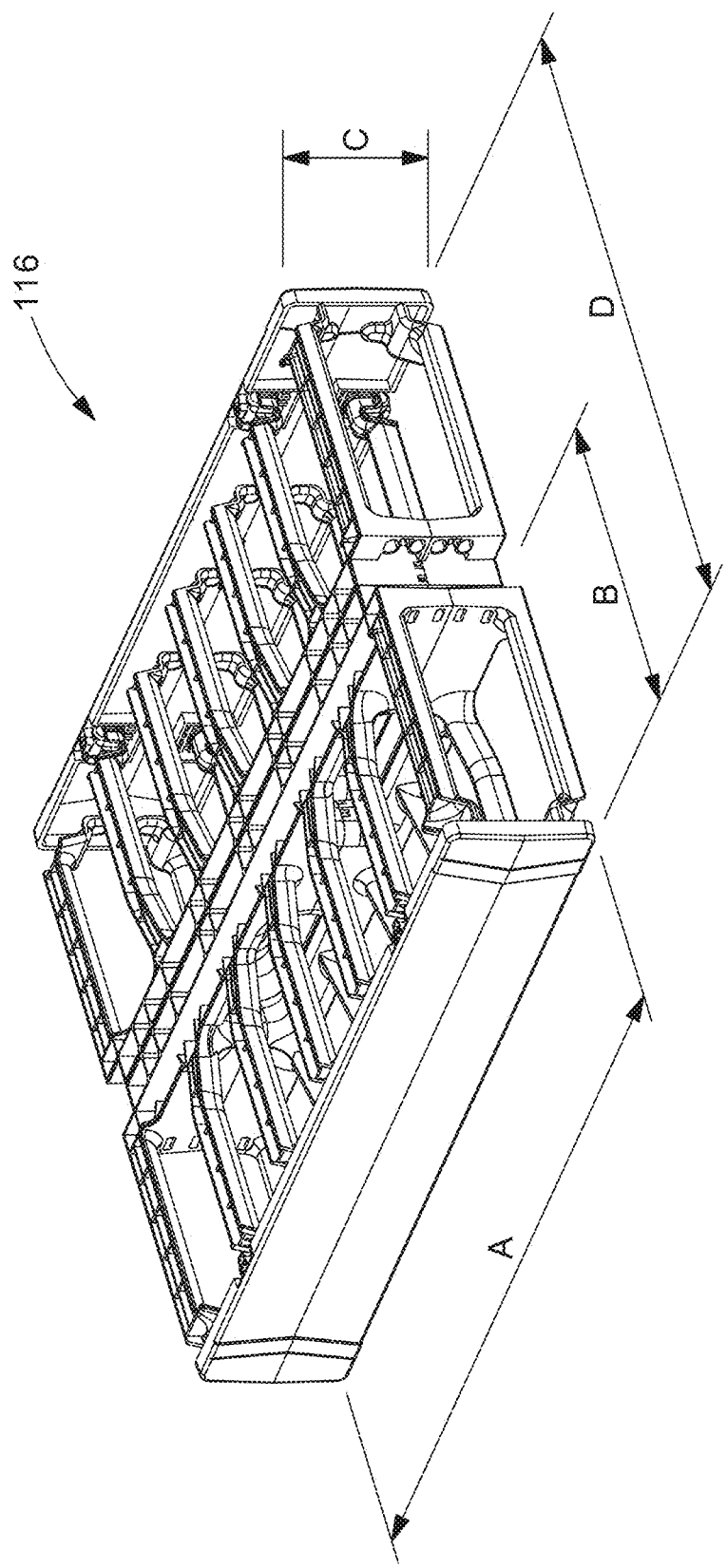
FIG. 21 illustrates a perspective view of an exemplary cable manager for use with non-limiting exemplary embodiments of the present disclosure.

In that regard, the application software of the equipment management solution may record location information about cable pathways products such as a cable manager or fiber runner and may download product information to determine a product's capacity for holding cables. FIG. 21 illustrates a perspective view of an exemplary cable manager 116 for use with non-limiting exemplary embodiments of the present disclosure.

As described by the flowchart 2900 shown in FIG. 29, after the application software of the equipment management solution documents rack unit equipment including cable managers 116 and cable pathway devices and cabling (180), and further exports the cable and equipment information with API product information to the DCIM solution (182).

Figure 22B:
FIG. 22B illustrates a cable capacity calculator for manual calculation of cable capacity, according to a non-limiting exemplary embodiment of the present disclosure.

Following this, a DCIM user may assign individual cables to a cable pathway product in a rack elevation such as a cable manager 116 or a fiber runner within the DCIM solution (184). The DCIM solution may download product information such as cable manager information and cable diameter information from an API for a cable manager's assigned cables to calculate total cable volumes (186). The DCIM solution is configured to compare these cable volumes to the cable holding capacity of a cable manager 116 to dynamically provide a fill percentage of the cable manager 116 or its available capacity for new cables (188). The present DCIM solution thus could replace the need for manual spreadsheet capacity calculators which are difficult to operate and provides a method to document cable capacity without manual data entry. In that regard, FIG. 22 illustrates a cable capacity calculator 118 for manual calculation of cable capacity.

In a further non-limiting exemplary embodiment of the present disclosure, DCIM solutions are configured to import results data from the equipment management solution to build intelligent workflows for mobile devices that include step-by-step installation instructions with installation validation and product information including but not limited to: product photos, product installation guides, and user manuals. In that regard, FIG. 30 shows a flowchart 3000 illustrating an exemplary method for work order creation and/or completion according to one non-limiting exemplary embodiment of the present disclosure.

Figure 30:
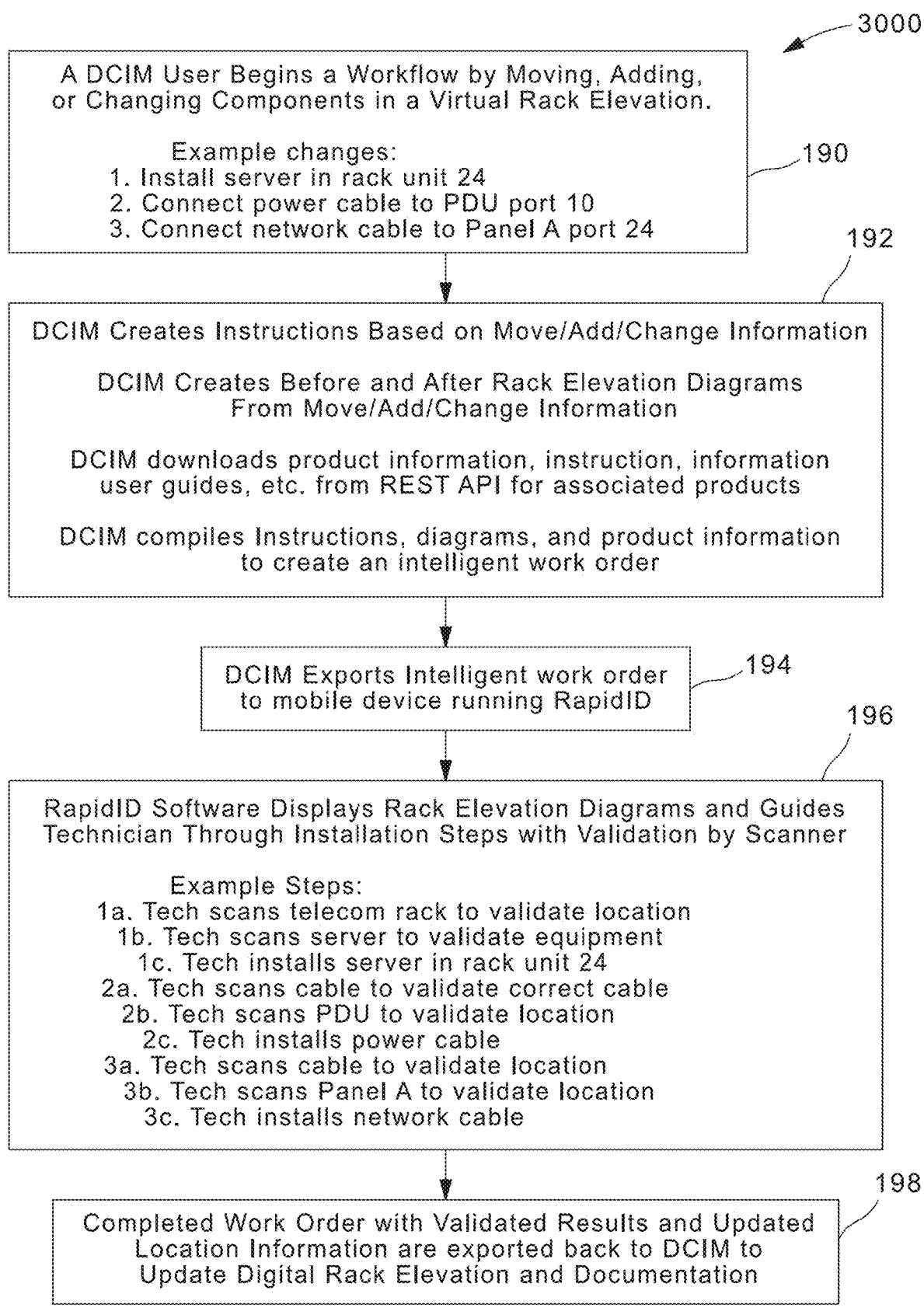
FIG. 30 illustrates a flowchart describing an exemplary method for work order creation and/or completion, according to a non-limiting exemplary embodiment of the present disclosure.

As described by the flowchart 3000 shown in FIG. 30, a DCIM user begins creating an intelligent work order by virtually moving, adding, or changing server/network equipment, cabling components, network/power connections, or other components to a virtual network cabinet/telecom rack/server enclosure represented in the DCIM solution (190). The DCIM user specifies cable type, products, and equipment to be used and locations to be installed/removed. The DCIM solution combines move/add/change data manually inputted by the user, products specified for use, and product information downloaded via an API gateway to create an intelligent work order with rack elevation diagrams (192), where these diagrams are created from product images (e.g., front view of telecom rack elevation) that visually display component locations, sequential step-by-step installation instructions with validation using the software relating to the equipment management solution and a barcode scanner 22, and/or other installation support documents like product photos, product installation guides, or user manuals.

According to the present disclosure, these intelligent workflows can be sent or exported by the DCIM system to the mobile computing device 16 running the application software of the equipment management solution for installation guidance in the field (194).

Intelligent workflows may be stored locally on the mobile computing device 16 for use when no network access is available. The application software of the equipment management solution running on the mobile computing device 16 can display the rack elevation diagrams of a workflow and an on-site technicians can follow the step-by-step instructions for that workflow (196). Furthermore, before or after each installation step is performed from the intelligent workflow, the application software of the equipment management solution and the barcode scanner 22 may be used to validate equipment location, cable location, and/or proper product has been installed by scanning product manufacturer's unique identifiers on products (196).

When all steps are completed and validated, updated documentation created by validation steps can be sent back to the DCIM to update the DCIM's virtual network cabinet/telecom rack/server enclosure with correct information (198).

It should be noted that the personal computer, mobile computing device 16, barcode scanner 22, and/or any other unit, module, controller, system, subsystem, mechanism, device, component, gateway, application, solution, software, algorithm, step, function, operation, or the like described herein may comprise and/or be implemented in or by appropriate circuitry, such as one or more appropriately programmed processors (e.g., one or more microprocessors including central processing units (CPU)) and associated memory or data storage medium, which may include stored operating system software and/or application software including computer or machine readable instructions executable by the processor(s) for controlling operation thereof and for performing the particular algorithms represented by the various functions and/or operations described herein, including interaction and/or communication between and/or cooperation with each other. One or more of such processors or several such processors and/or circuitry and/or hardware may also be distributed among several separate computers, units, modules, controllers, systems, subsystems, mechanisms, devices, components, gateways or the like. It is also noted that additional details, benefits, and advantages concerning, related to, or resulting from the non-limiting exemplary embodiments of the present disclosure are set forth in the attached appendix, which is part of the present disclosure and incorporated herein by reference.

For example, FIG. 2 shows a block diagram of an exemplary computer architecture for a computing device system 200. For example, the computing device system 200 may be representative of the components included in the mobile computing device 16 or other computing device disclosed herein for implementing one or more of the features relating to the cable management solution and/or the DCIM solution. Although not specifically illustrated, the computing device system 200 may additionally include software, hardware, and/or circuitry for implementing attributed features as described herein.

The computing device system 200 includes a processor 210, a main memory 220, a static memory 230, an output device 250 (e.g., a display or speaker), an input device 260, and a storage device 270, communicating via a bus 201. The bus 201 may represent one or more busses, e.g., USB, PCI, ISA (Industry Standard Architecture), X-Bus, EISA (Extended Industry Standard Architecture), or any other appropriate bus and/or bridge (also called a bus controller).

The processor 210 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 210 executes instructions 221, 231, 272 stored on one or more of the main memory 220, static memory 230, or storage device 270, respectively. The processor 210 may also include portions of the computing device system 200 that control the operation of the entire computing device system 200. The processor 210 may also represent a controller that organizes data and program storage in memory and transfers data and other information between the various parts of the computing device system 200.

The processor 210 is configured to receive input data and/or user commands through input device 260 or received from a network 202 through a network interface 240. Input device 260 may be a keyboard, mouse or other pointing device, trackball, scroll, button, touchpad, touch screen, keypad, microphone, speech recognition device, video recognition device, accelerometer, gyroscope, global positioning system (GPS) transceiver, or any other appropriate mechanism for the user to input data to computing device system 200 and control operation of computing device system 200. Input device 260 as illustrated in FIG. 2 may be representative of any number and type of input devices.

The processor 210 may also communicate with other computer systems via the network 202 to receive control commands or instructions 221, 231, 272, where processor 210 may control the storage of such control commands or instructions 221, 231, 272 into any one or more of the main memory 220 (e.g., random access memory (RAM)), static memory 230 (e.g., read only memory (ROM)), or the storage device 270. The processor 210 may then read and execute the instructions 221, 231, 272 from any one or more of the main memory 220, static memory 230, or storage device 270. The instructions 221, 231, 272 may also be stored onto any one or more of the main memory 220, static memory 230, or storage device 270 through other sources. The instructions 221, 231, 272 may correspond to, for example, instructions for implementing the cable management and/or DCIM solution to track and manage the data center equipment within the system 100 illustrated in FIG. 1.

Although the computing device system 200 is represented in FIG. 2 as a single processor 210 and a single bus 201, the disclosed embodiments apply equally to computing device system that may have multiple processors and to computing device system that may have multiple busses with some or all performing different functions in different ways.

The storage device 270 represents one or more mechanisms for storing data. For example, the storage device 270 may include a computer readable medium 271 such as read-only memory (ROM), RAM, non-volatile storage media, optical storage media, flash memory devices, and/or other machine-readable media. In other embodiments, any appropriate type of storage device may be used. Although only one storage device 270 is shown, multiple storage devices and multiple types of storage devices may be present. Further, although the computing device system 200 is drawn to contain the storage device 270, it may be distributed across other computer systems that are in communication with the computing device system 200, such as a server in communication with the computing device system 200. For example, when the computing device system 200 is representative of the mobile computing device 16, the storage device 270 may be distributed across to include a remote database (e.g., database 31).

The storage device 270 may include a controller (not shown) and a computer readable medium 271 storing instructions 272 capable of being executed by the processor 210 to carry out the cable management and/or DCIM solution, as described herein. In another embodiment some, or all, the functions are carried out via hardware in lieu of a processor-based system. In some embodiments, the included controller is a web application browser, but in other embodiments the controller may be a database system, a file system, an electronic mail system, a media manager, an image manager, or may include any other functions capable of accessing data items.

The output device 250 is configured to present information to the user. For example, the output device 250 may be a display such as a liquid crystal display (LCD), a gas or plasma-based flat-panel display, or a traditional cathode-ray tube (CRT) display or other well-known type of display that may, or may not, also include a touch screen capability. Accordingly, the output device 250 may function to display a graphical user interface (GUI) such as the GUI for enabling a user to implement the cable management and/or DCIM solution, as described herein. In other embodiments, the output device 250 may be a speaker configured to output audible information to the user. In still other embodiments, any combination of output devices may be represented by the output device 250.

Computing device system 200 also includes the network interface 240 that allows communication with other computers via the network 202, where the network 202 may be any suitable network and may support any appropriate protocol suitable for communication to/from computing device system 200. In an embodiment, the network 202 may support wireless communications. In another embodiment, the network 202 may support hard-wired communications, such as a telephone line or cable. In another embodiment, the network 202 may support the Ethernet IEEE (Institute of Electrical and Electronics Engineers) 802.3x specification. In another embodiment, the network 202 may be the Internet (e.g., the internet connection 40 illustrated in FIG. 1) and may support IP (Internet Protocol). In another embodiment, the network 202 may be a local area network (LAN) or a wide area network (WAN). In another embodiment, the network 202 may be a hotspot service provider network. In another embodiment, network 202 may be an intranet. In another embodiment, the network 202 may be a GPRS (General Packet Radio Service) network. In another embodiment, the network 202 may be any appropriate cellular data network or cell-based radio network technology. In another embodiment, the network 202 may be an IEEE 802.11 wireless network. In another embodiment, the network 202 may be representative of an Internet of Things (IoT) network. In still another embodiment, the network 202 may be any suitable network or combination of networks. Although one network 202 is shown in FIG. 2, the network 202 may be representative of any number of networks (of the same or different types) that may be utilized.

The network interface 240 provides the computing device system 200 with connectivity to the network 202 through any compatible communications protocol. The network interface 240 sends and/or receives data from the network 202 via a wireless or wired transceiver 241. The transceiver 241 may be a cellular frequency, radio frequency (RF), infrared (IR), Bluetooth, or any of a number of known wireless or wired transmission systems capable of communicating with the network 202 or other computer device having some or all of the features of the computing device system 200. The network interface 240 as illustrated in FIG. 2 may be representative of a single network interface card configured to communicate with one or more different data sources. Furthermore, the network interface 240 may be representative of AV related communication ports such as high-definition multimedia interface (HDMI), DisplayPort, or mini DisplayPort (MDP), as well as data communication ports such as ethernet, universal serial bus (USB), power over ethernet (POE), or single pair ethernet (SPE).

The computing device system 200 may be implemented using any suitable hardware and/or software, such as a personal computer or other electronic computing device. In addition, the computing device system 200 may also be a smartphone, portable computer, laptop, tablet or notebook computer, PDA, appliance, IP telephone, server computer device, AV gateway, cloud service platform, or mainframe computer.

As is readily apparent from the foregoing, various non-limiting exemplary embodiments of an improved system, method, and non-transitory computer readable storage medium for management of telecommunication or data center infrastructure have been described. While various embodiments have been illustrated and described herein, they are exemplary only and it is not intended that these embodiments illustrate and describe all those possible. Instead, the words used herein are words of description rather than limitation, and it is understood that various changes may be made to these embodiments without departing from the spirit and scope of the following claims.

What is claimed is:

1. A system for management of telecommunication or data center infrastructure including a plurality of components, the system comprising:
 a scanner configured to scan a unique identifier attached to a component of the infrastructure; and
 a mobile computing device comprising a processor, a memory storing machine readable instructions, a communication unit, and a user interface including a display, wherein the processor is configured to execute the machine readable instructions to:
  receive, from the scanner, a component identifier associated with the component obtained via a scan of the unique identifier attached to the component;
  associate the component identifier with a location of the component in the infrastructure;
  display, on the user interface, the component identifier associated with the location of the component;
  receive, via an input to the user interface, a current fill amount for the component;
  export, via the communication unit, the location of the component to a management solution;
  wherein the management solution is configured to:
   download manufacturer information from a remote database comprising information associated with the component;
   generate a dynamic real-time capacity for the component based on the manufacturer information and the current fill amount for the component; and
   display, on the user interface, the dynamic real-time capacity for the component that includes a remaining capacity left for the component.

2. The system of claim 1, wherein the processor is further configured to execute machine readable instructions to:
 download component information from a remote database comprising information associated with the component; and
 export the downloaded component information to the management solution.

3. The system of claim 2, wherein the management solution is further configured to:
 automatically generate a diagrammatic representation of the infrastructure based on the location of the component and the downloaded component information.

4. The system of claim 2, wherein the management solution is further configured to:
 automatically generate network channels and power chains identifying mappings of connections including the component and predicted performance data based on the mappings of connections and the component information.

5. The system of claim 1, wherein the manufacturer information comprises at least one of (i) a type of the component, (ii) product specific information associated with the component, (iii) mapping and/or wiring information associated with the component, (iv) volume and/or capacity associated with the component, (v) instruction information, and/or (vi) user guides.

6. The system of claim 5, wherein management of the component comprises:
 automatically generating a diagrammatic representation of the infrastructure based on the location of the component and the downloaded manufacturer information;
 automatically generating an intelligent work order for an infrastructure management action based on the diagrammatic representation of the infrastructure and downloaded instruction information and/or user guides, wherein the intelligent work order includes step-by-step instructions to accomplish the infrastructure management action;

exporting the intelligent work order to the mobile device;

receiving from the mobile device a completed work order comprising validated results and updated location information for at least one component; and automatically generating an updated diagrammatic representation of the infrastructure based on the updated location information.

7. The system of claim 5, wherein the management solution is further configured to:

automatically create a network channel based on downloaded mapping and/or wiring information.

8. The system of claim 1, wherein the dynamic real-time capacity includes a fill percentage and/or an available capacity based on downloaded volume and/or capacity information.

9. The system of claim 1, wherein the management solution comprises a data center infrastructure management (DCIM) solution or a network management system (NMS).

10. A mobile computing device comprising:

a communication unit;

a user interface including a display;

a processor; and a memory configured to store machine readable instructions, wherein the processor is configured to execute the machine readable instructions to:

receive, from a scanner, a component identifier associated with the component obtained via a scan of a unique identifier attached to the component;

associate the component identifier with a location of the component in an infrastructure;

display, on the user interface, the component identifier associated with the location of the component;

receive, via an input to the user interface, a current fill amount for the component;

export, via the communication unit, the location of the component to a management solution wherein the management solution is configured to:

download manufacturer information from a remote database comprising information associated with the component;

generate a dynamic real-time capacity for the component based on the manufacturer information and the current fill amount for the component; and display, on the user interface, the dynamic real-time capacity for the component that includes a remaining capacity left for the component.

11. The mobile computing device of claim 10, wherein the processor is further configured to execute machine readable instructions to:

download component information from a remote database comprising information associated with the component; and export the downloaded component information to the management solution.

12. The mobile computing device of claim 11, wherein the component information comprises a type of the component or product specific information associated with a type of the component.

13. An infrastructure management system comprising:

a communication unit configured to receive results data from an equipment management solution, the results data including information corresponding to a location of a component and downloaded component information;

a processor; and a memory configured to store machine readable instructions, wherein the processor is configured to execute the machine readable instructions to:

receive, from the scanner, a component identifier associated with the component obtained via a scan of the unique identifier attached to the component;

associate the component identifier with a location of the component in the infrastructure;

display, on the user interface, the component identifier associated with the location of the component;

receive, via an input to the user interface, a current fill amount for the component;

export, via the communication unit, the location of the component to a management solution;

wherein the management solution is configured to:

download manufacturer information from a remote database comprising information associated with the component;

generate a dynamic real-time capacity for the component based on the manufacturer information and the current fill amount for the component; and display, on the user interface, the dynamic real-time capacity for the component that includes a remaining capacity left for the component.

14. The infrastructure management system of claim 13, wherein the processor is further configured to execute machine readable instructions to:

automatically generate network channels and power chain representations based on the results data.

15. The infrastructure management system of claim 13, wherein the processor is further configured to execute machine readable instructions to:

download component information from a remote database comprising information associated with the component.

16. The infrastructure management system of claim 13, wherein the manufacturer information comprises at least one of (i) a type of the component, (ii) product specific information associated with the component, (iii) mapping and/or wiring information associated with the component, (iv) volume and/or capacity associated with the component, (v) instruction information, and/or (vi) user guides.

17. The infrastructure management system of claim 13, wherein the processor is further configured to execute machine readable instructions to:

automatically create a diagrammatic representation of the infrastructure based on the results data;

automatically create an intelligent work order for an infrastructure management action based on the diagrammatic representation of the infrastructure and downloaded instruction information and/or user guides, wherein the intelligent work order includes step-by-step instructions to accomplish the infrastructure management action;

export the intelligent work order to a mobile device;

receive, from the mobile device, a completed work order comprising validated results and updated location information for at least one component; and automatically generate an updated diagrammatic representation of the infrastructure based on the updated location information.

18. The infrastructure management system of claim 17, wherein the processor is further configured to execute the machine readable instructions to:
   automatically generate a network channel based on downloaded mapping and/or wiring information.

19. The infrastructure management system of claim 17, wherein the dynamic real-time capacity includes:
   a fill percentage and/or an available capacity based on downloaded volume and/or capacity information.

* * * * *